(12) United States Patent
Niioka et al.

(10) Patent No.: US 8,780,300 B2
(45) Date of Patent: Jul. 15, 2014

(54) OPTICAL MEMBER, LIGHT SOURCE APPARATUS, DISPLAY APPARATUS, AND TERMINAL APPARATUS

(75) Inventors: Shinya Niioka, Tokyo (JP); Ken Sumiyoshi, Tokyo (JP); Shin-ichi Uehara, Tokyo (JP); Masao Imai, Tokyo (JP); Kenichi Takatori, Tokyo (JP); Fujio Okumura, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 1421 days.

(21) Appl. No.: 11/473,277

(22) Filed: Jun. 23, 2006

(65) Prior Publication Data

US 2006/0291243 A1    Dec. 28, 2006

(30) Foreign Application Priority Data

Jun. 24, 2005  (JP) ................. 2005-185773

(51) Int. Cl.
*G02F 1/1335*   (2006.01)
(52) U.S. Cl.
USPC .................. 349/66; 349/62; 349/65
(58) Field of Classification Search
USPC ......................... 349/66, 62, 64, 65
See application file for complete search history.

(56) References Cited

U.S. PATENT DOCUMENTS

| | | | |
|---|---|---|---|
| 3,919,559 A | 11/1975 | Stevens | |
| 3,972,593 A | 8/1976 | Appeldorn et al. | |
| 5,543,870 A * | 8/1996 | Blanchard | 353/74 |
| 5,644,369 A * | 7/1997 | Jachimowicz et al. | 349/10 |
| 5,661,603 A | 8/1997 | Hanano et al. | |
| 5,949,402 A * | 9/1999 | Garwin et al. | 345/156 |
| 6,046,849 A | 4/2000 | Moseley et al. | |
| 6,185,038 B1 * | 2/2001 | Yamaguchi et al. | 359/457 |
| 6,491,396 B2 * | 12/2002 | Karasawa et al. | 353/20 |
| 6,527,410 B2 * | 3/2003 | Yamaguchi | 362/243 |
| 6,798,572 B2 | 9/2004 | Jinno et al. | |

FOREIGN PATENT DOCUMENTS

| | | |
|---|---|---|
| JP | 62-005406 U | 1/1987 |
| JP | 06-308485 A | 11/1994 |
| JP | 7-318729 A | 12/1995 |
| JP | 8-21748 A | 1/1996 |
| JP | 09-244018 | 9/1997 |
| JP | 10-319384 A | 12/1998 |
| JP | 11-295705 | 10/1999 |
| JP | 2002-311425 A | 10/2002 |

* cited by examiner

*Primary Examiner* — Lucy Chien
*Assistant Examiner* — Paisley L Arendt
(74) *Attorney, Agent, or Firm* — Dickstein Shapiro LLP

(57) ABSTRACT

A planar light source, Fresnel lens sheet, and louver are disposed in the stated order in a light source apparatus. The Fresnel lens sheet deflects and focuses in one dimension light that has entered from the planar light source. The louver is disposed in the optical path of the light emitted from the Fresnel lens sheet, and the directivity of the light can be increased by restricting the traveling direction of the light to the focal direction of the Fresnel lens sheet. The light utilization ratio can thereby be increased, the directivity of planarly emitted light can be increased, and the brightness can be made uniform at the point of observation.

12 Claims, 21 Drawing Sheets

L: LUMINOUS FLUX
L1: PRINCIPAL-DIRECTION
    COMPONENT
L2: LATERAL-DIRECTION
    COMPONENT

OPTICAL MEMBER, LIGHT SOURCE APPARATUS, DISPLAY APPARATUS, AND TERMINAL APPARATUS

BACKGROUND OF THE INVENTION

1. Field of the Invention

The present invention relates to an optical member that increases the directivity of light emitted in the form of a plane, a light source apparatus that can emit light with high directivity, a display apparatus provided with the light source apparatus, and a terminal apparatus in which the display apparatus is mounted.

2. Description of the Related Art

A liquid crystal display apparatus (hereinafter abbreviated as "LCD") is conventionally used as a flat display apparatus. An LCD is widely used as the display apparatus of a mobile terminal. In such a mobile terminal, there are many cases in which one does not want to have other people view displayed information, and the LCD preferably has a narrow viewing angle in such cases. However, there are also cases in which information displayed on a mobile terminal is shared and viewed by other people, and the LCD preferably has a wide viewing angle in such cases. Therefore, a technology is needed for switching the viewing angle in accordance with the service conditions.

A liquid crystal display apparatus that fills such a need is disclosed in Japanese Laid-Open Patent Application No. 9-244018 (FIG. 3). FIG. 1 is a cross-sectional diagram showing the conventional liquid crystal display apparatus with a controlled viewing angle cited in Japanese Laid-Open Patent Application No. 9-244018 (FIG. 3). FIG. 2 is a perspective view showing an illumination device provided to the liquid crystal display with a controlled viewing angle. A conventional liquid crystal display apparatus 101 with a controlled viewing angle has a liquid crystal display panel 102, a scattering control device 103, and an illumination apparatus 104 in the stated order, as shown in FIG. 1.

The illumination apparatus 104 is provided with a sheet 120 that has light-blocking slits, and is also provided with an illumination unit 121, as shown in FIG. 2. The illumination unit 121 is provided with a fluorescent light tube or another light source 122, and a reflective sheet 124 for reflecting light emitted from the light source 122. The surface on the opposite side of the reflective sheet 124 is a light-emitting surface 123, as viewed from the light source 122. The light emitted from the light-emitting surface 123 is directed to the sheet 120 having light-blocking slits. In the sheet 120 having light-blocking slits, a large number of thick light-blocking materials are arranged in the form of stripes on one of the surfaces of a transparent sheet. The direction in which the light-blocking material is extended matches the perpendicular direction of the display unit. Also, the side surface of the light-blocking material is parallel to the direction that is perpendicular to the screen of the display apparatus 101.

The scattering control device 103 changes the extent to which incident light is scattered by the application of voltage. For example, a transparent state is maintained when voltage is not applied, and incident light is transmitted without being scattered. When voltage is applied, the state becomes cloudy, and incident light is scattered and transmitted.

In the conventional liquid crystal display apparatus with a controlled viewing angle, the light that is output from the light source 122 is directly emitted, or reflected by the reflective sheet 124 and emitted from the light-emitting surface 123, and is allowed to enter the sheet 120 having light-blocking slits, as shown in FIG. 2. The light is blocked by the light-blocking material when passing through the sheet 120 with light-blocking slits after having entered from a direction inclined at a fixed angle or greater in the array direction of the light-blocking material away from the direction that is perpendicular (normal direction) to the surface of the sheet 120 having light-blocking slits. For this reason, only light inclined away from the normal direction at an angle that is less than a fixed angle can pass through the sheet 120 with light-blocking slits. As a result, the directivity of light emitted from the illumination unit 121 can be increased by passing the light through a sheet 120 having light-blocking slits.

The light emitted from the sheet 120 having light-blocking slits enters the scattering control device 103. At this point, when the scattering control device 103 is in a scattering state, the incident light is scattered by the scattering control device 103 and emitted in a state of reduced directivity. Conversely, when the scattering control device 103 is in a transparent state, the incident light passes directly through the scattering control device 103 and is emitted in an unchanged state of high directivity.

The light emitted from the scattering control device 103 enters the liquid crystal display panel 102 and passes through the liquid crystal display panel 102, whereby an image is added. If the scattering control device 103 is in a scattering state at this time, light with reduced directivity will enter the liquid crystal display panel 102, pass through the liquid crystal display panel 102, and depart in all visual angle directions. The image can thereby be viewed not only from positions that correspond to the direction perpendicular to the display surface of the illumination apparatus 104 (hereinafter referred to as the "front position"), but also from positions offset from the front position in the horizontal direction of the screen (hereinafter referred to as "diagonal position"). In contrast, if the scattering control device 103 is in a transparent state, light with high directivity enters the liquid crystal display panel 102, passes through the liquid crystal display panel 102, and departs only in the front surface direction. As a result, the image can be viewed from the front position but the screen is pitch-dark when viewed from a diagonal position, and the image cannot be viewed because light that has passed through the liquid crystal display panel 102 does not arrive at the diagonal position.

Thus, in the liquid crystal display apparatus 101 with a controlled viewing angle, the scattering of light can be controlled by the scattering control device 103, and the display viewing angle can therefore also be controlled. The illumination apparatus 104 is provided with a sheet 120 having light-blocking slits, which allows the display content to be recognized only by a viewer in the front position when the scattering control device 103 is in a transparent state, because light with high directivity can be emitted toward the liquid crystal display panel 102. Therefore, the illumination apparatus 104 can be arbitrarily switched between a wide-viewing-angle display that has low viewing angle dependency and that maintains uniform display characteristics for all viewing angle directions, and a narrow-viewing-angle display that allows the display image to be viewed only from the position directly in front (front position) of the display unit.

However, the display apparatus cited in Japanese Laid-Open Patent Application No. 9-244018 (FIG. 3) has the following problems. When the display apparatus is applied to a large display screen, the perspective angle of the screen edges increases when the screen is viewed by a viewer positioned in the front position of the display apparatus. In other words, although there is a match between the line-of-view direction and the normal direction of the screen in the center area of the screen, these directions do not match at the edge portions of the screen. For this reason, when the narrow-viewing-angle display is used, light emitted from the edge portions of the screen is unlikely to reach a viewer who is positioned in the front position. As a result, an observer perceives a brightness reduction at the edge portions of the screen, and the viewability in this area is reduced. This effect is particularly marked in a display apparatus having a relatively large display screen because the perspective angle increases at the edge portions of the screen.

Disclosed in Japanese Laid-Open Patent Application No. 11-295705 (FIG. 8), for example, is a liquid crystal display apparatus in which the slit intervals of a sheet with light-blocking slits are distributed. In the liquid crystal display apparatus cited in Japanese Laid-Open Patent Application No. 11-295705 (FIG. 8) the display panel is a polymer-dispersed liquid crystal panel. FIG. 3 is a cross-sectional view showing the polymer-dispersed liquid crystal display cited in Japanese Laid-Open Patent Application No. 11-295705 (FIG. 8). The liquid crystal display apparatus 201 has a backlight unit 202, an anisotropic photoabsorption film 203, and a polymer-dispersed liquid crystal panel 204 in the stated order, as shown in FIG. 3. The backlight unit 202 is provided with a light-guide plate 205, and a light source 206 is disposed to the side of the light-guide plate 205. In the light-guide plate 205, light that has entered from the side surface of the plate is emitted from the principal surface of the plate, i.e., the surface of the side that faces the anisotropic photoabsorption film 203. Also, a photoabsorption layer 207 is disposed on the side opposite from the anisotropic photoabsorption film 203, as viewed from the light-guide plate 205.

The anisotropic photoabsorption film 203 is composed of a transparent portion 208 and an opaque portion 209, and the boundary between the two portions is perpendicular with respect to the surface of the anisotropic photoabsorption film 203. As viewed from the direction perpendicular to the surface of the anisotropic photoabsorption film 203, the transparent portion 208 is divided into a plurality of areas, the shape of each area is circular or polygonal, and the opaque portion 209 surrounds each of these areas. In the diagram, A is the maximum inside diameter of each area of the transparent portion 208, t is the thickness of the anisotropic photoabsorption film 203, and the values of the ratios (t/A) are made to be mutually different within the display area.

Two transparent substrates 210 are disposed apart from and parallel to each other in the polymer-dispersed liquid crystal panel 204, and a light-modulating layer 211 is disposed between the transparent substrates 210. The light-modulating layer 211 is composed of a polymer material 212 and a liquid crystal material 213 sealed inside the polymer material 212.

In the liquid crystal display apparatus 201, the values of the ratios (t/A) are distributed within the plane of the anisotropic photoabsorption film 203, as described above. It is believed that this technology allows the value of the ratio (t/A) at the edge portions of the screen to be kept below the value of the ratio (t/A) in the center area, whereby the brightness at the edge portions of the screen is made greater than at the center, and the brightness within the screen is kept uniform when the screed is viewed from the front position There is a problem in this case, however, in that the directivity of the light that passes through the edge portions of the screen is lower than the directivity of the light that passes through the center area of the screen. Since the brightness of the edge portions of the screen is made relatively high, the brightness in the center area of the screen must be reduced more than necessary, and the light utilization ratio is reduced.

In view of the above situation, it is possible to consider the use of the convergent louver cited in U.S. Pat. No. 3,919,559 (FIG. 7) in place of the sheet 120 with light-blocking slits shown in FIG. 2 and the anisotropic photoabsorption film 203 shown in FIG. 3. FIG. 4 is a perspective view showing the convergent louver cited in U.S. Pat. No. 3,919,559 (FIG. 7). The conventional convergent louver 301 is in the form of a sheet, and a transparent layer 302 and light-blocking layer 303 are periodically arrayed along a parallel single direction on the surface of the convergent louver 301, as shown in FIG. 4. The boundary between the transparent layer 302 and light-blocking layer 303 is sloped toward the direction perpendicular to the surface of the convergent louver 301, the angle of the slope is low in the center area of the convergent louver 301, and the angle increases toward the edge portions along the array direction of the transparent layer 302 and light-blocking layer 303.

The direction in which light rays are restricted in each position of the screen can be oriented toward the front position by incorporating the convergent louver 301 into the display apparatus. Light in the direction traveling from the edges of the screen to the front position is thereby no longer blocked. As a result, the display apparatus has improved brightness in the edge portions of the screen as viewed from the front position in comparison with the display apparatus cited in U.S. Pat. No. 3,919,559. Since only the side surface of the light-blocking layer 303 can be seen from the front position, the effect that the light-blocking layer 303 has on the image can be reduced and viewability can be improved.

However, the above-described art has the following problems. When the convergent louver (see FIG. 4) cited in U.S. Pat. No. 3,919,559 (FIG. 7) is used as the element for restricting the direction of light rays in a display apparatus, as described above, light in the direction traveling from the edges of the screen to the front position is no longer blocked. In such a case, however, the brightness at the edge portions of the screen cannot be sufficiently improved. The reasons for this are described below.

FIG. 5 is a perspective view schematically showing the operation of a light source apparatus provided with the convergent louver cited in U.S. Pat. No. 3,919,559 (FIG. 7) as an element for restricting the direction of light rays. The light source apparatus is provided with a planar light source 421 and a convergent louver 422, as shown in FIG. 5. Since the distribution characteristics of light emitted from the planar light source 421 is uniform within the plane, it is believed that the luminous flux 401 is arrayed in an orderly manner on the light-emitting surface. In the luminous flux 401, the brightness is at its maximum in the direction perpendicular to the light-emitting surface of the planar light source 421, and this direction is the principal direction of light rays. Of the luminous flux 401, the component in the principal direction of the light rays is referred to as the principal-direction component 402, and of the luminous flux 401, the components other than the principal-direction component 402 are referred to as the lateral-direction component 403. The lateral-direction component 403 is smaller than the principal-direction component 402.

Conversely, in the convergent louver 422, a transmissive layer 410 and a light-blocking layer 411 are alternately arrayed in the same manner as the convergent louver shown in FIG. 4, and the slope angle of the boundary between the transmissive layer 410 and light-blocking layer 411 varies in this array direction.

The operation of the display apparatus is described next. The luminous flux 401, emitted from the planar light source 421 and composed of the principal-direction component 402 and lateral-direction component 403, enters the convergent louver 422. At this point, in the convergent louver 422, the lateral-direction component 403 of the luminous flux 401 that has entered the center area in the array direction of the transmissive layer 410 and light-blocking layer 411 is blocked by the light-blocking layer 411, and only the principal-direction component 402 passes through the convergent louver 422. In contrast, the principal-direction component 402 of the luminous flux 401 that has entered the two edges in the array direction in the convergent louver 422 is blocked by the light-blocking layer 411, and only a portion of the lateral-direction component 403 that is substantially parallel to the boundary between the transmissive layer 410 and light-blocking layer 411 passes through the convergent louver 422. The principal-direction component 402 of the luminous flux 401 is thereby emitted from the center area in the array direction of the convergent louver 422, and a portion of the lateral-direction component 403 is emitted from the two edge portions in the array direction.

However, since the intensity of a portion of the lateral-direction component 403 is less than the intensity of the principal-direction component 402, the two edge portions of the screen again appear dark when viewed by an observer positioned in the front position. In other words, the absorption ratio of the light varies in accordance with the slope of the light-blocking layer 411, and the transmissivity is therefore low at the edge portions in which the slope of the light-blocking layer is large, and increases near the center, where the light-blocking layer is perpendicularly arrayed. The light in the direction perpendicular to the surface of the planar light-emitting source is inefficient because more light is absorbed by the significantly sloped light-blocking layer 411. Additionally, since the photoabsorption ratio of the convergent louver 422 is distributed in the array direction, the brightness is uneven within the plane.

It is also possible to consider using as a planar light source 421 a light source in which light is isotropically emitted in order to make the transmissivity of the light uniform in the convergent louver 422. In such a case, however, the ratio of the luminous energy blocked by the light-blocking layer 411 of the convergent louver 422 increases, and the light transmission efficiency is considerably reduced. As a result, the light utilization ratio is dramatically reduced, and power consumption is increased or image quality reduced.

SUMMARY OF THE INVENTION

An object of the present invention is to provide an optical member that has a high light utilization ratio, that increases the directivity of planarly-emitted light, and that can make the brightness uniform with respect to the point of observation; to provide a light source apparatus that efficiently emits planar light with high directivity in a uniform fashion with respect to the point of observation; to provide a display apparatus that has a high light utilization ratio and uniform brightness in the screen; and to provide a terminal apparatus.

The optical member according to the first aspect of the present invention has a deflecting element for deflecting and emitting incident light, and an element for restricting the direction of light s rays that is intermediately disposed in the optical path of the light restricts the traveling direction of the light to the direction parallel to the optical path, and increases the directivity of the light.

In the present invention, planar light can be directed to the point of observation by using a deflecting element to deflect light. The directivity of light can be improved while the transmissivity at which light passes through the clement for restricting the direction of light rays can be increased and made uniform by disposing the element in the optical path of light and restricting the traveling direction of the light to the direction that is parallel to the optical path. The brightness can thereby be made uniform while the light utilization ratio is kept high.

The optical member according to the second aspect of the present invention has a deflecting element for deflecting and emitting incident light, and an element for restricting the direction of light rays that increases the directivity of the light and emits the light by causing the traveling direction of light incident from the deflecting element to be restricted to the direction that is parallel to the optical path of the light.

In the present invention, light can be directed to the point of observation by using a deflecting element to deflect light. The transmissivity at which light. passes through the element for restricting the direction of light rays can be increased and made uniform by establishing a match between the traveling direction of the deflected light and the direction in which the light rays are restricted by the element for restricting the direction of light rays. The brightness can thereby be made uniform while the light utilization ratio is kept high.

The optical member according to the third aspect of the present invention has an element for restricting the direction of light rays that restricts the traveling direction of incident light to the direction that is parallel to the optical path of the light, and emits the light; and a deflecting element for deflecting and emitting light that is incident from the element for restricting the direction of light rays.

In the present invention, the element for restricting the direction of light rays enhances the directivity of the light, and the light can then be directed toward the point of observation by deflecting the light with a deflecting element. In this case, the direction of the light rays is restricted for the light before deflection, and the transmissivity at which light passes through the element for restricting the direction of light rays can therefore be increased and made uniform. The brightness can thereby be made uniform while the light utilization ratio is kept high.

Also, the deflecting element may be one in which the light-deflecting direction varies depending on the incident position of light, and which focuses the light toward a single externally positioned imaginary straight line. Light can thereby be focused in one dimension.

Alternatively, the deflecting element may be one in which the light-deflecting direction varies depending on the incident position of light, and which focuses the light toward a single externally positioned point. Light can thereby be focused in two dimensions.

The deflecting element is furthermore preferably a Fresnel lens. The optical member can thereby be made thinner.

The light source apparatus according to the fourth aspect of the present invention has a planar light source for emitting planar light, and the optical member for receiving light emitted from the planar light source.

In the present invention, light that is planarly emitted from a planar light source is caused to enter the optical member, thereby allowing the light to be emitted with good efficiency and uniformity to a point of observation.

The light source apparatus according to the fifth aspect of the present invention has a light source; a light-guide plate in which light emitted from the light source is incident on the side surface thereof, and the incident light is planarly emitted from the principal surface thereof; and an element for restricting the direction of light rays that increases the directivity of the light by causing the traveling direction of light incident from the light-guide plate to be restricted to the principal direction of the light, and emits the light, wherein the light-guide plate is one in which the light-emitting direction varies depending on the emitting position of the light.

In the present invention, light can be directed to the point of observation because the light-guide plate is one in which the light-emitting direction varies depending on the emitting position of the light. The directivity of light can be improved while allowing the transmissivity at which light passes through the element for restricting the direction of light rays to be kept high and uniform by disposing an element for restricting the direction of light rays in the optical path of the light and restricting the traveling direction of the light to the direction parallel to the optical path. The light can be emitted toward a point of observation with good efficiency and uniformity.

The light source apparatus according to the sixth aspect of the present invention has a light source; a light-guide plate in which light emitted from the light source is incident on the side surface thereof, and the incident light is planarly emitted from the principal surface thereof; a reflective plate which is disposed on the side opposite from the principal plane as viewed from the light-guide plate, and whereby light that is incident from the light-guide plate is reflected toward the light-guide plate; and an element for restricting the direction of light rays that increases the directivity of the light by causing the traveling direction of light incident from the light-guide plate to be restricted to the principal direction of the light, and emitting the light, wherein the reflective plate is one in which the reflective direction thereof varies depending on the incident position of light.

In the present invention, light can be directed to the point of observation because the reflective plate is one in which the reflective direction thereof varies depending on the incident position of light. The directivity of light can be improved while allowing the transmissivity at which light passes through the element for restricting the direction of light rays to be kept high and uniform by disposing an element for restricting the direction of light rays in the optical path of the light and restricting the traveling direction of the light to the direction parallel to the optical path. The light can be emitted toward a point of observation with good efficiency and uniformity.

The light source apparatus preferably has a transparent/scattering switching element that can switch between a transparent state in which light emitted from the element for restricting the direction of light rays is allowed to pass, and a scattering state in which the light is scattered.

The display apparatus of the present invention has the above-described light source apparatus and a display panel for adding an image to light by transmitting the light emitted from the light source apparatus.

The terminal apparatus of the present invention has the display apparatus. Also, the terminal apparatus may be a television receiver, desktop personal computer, notebook computer, ATM (Automated Teller Machine), automatic vending machine, onboard television receiver, PDA (Personal Digital Assistance), game machine, digital video camera, digital camera, video player, or mobile phone.

In accordance with the present invention, planar light can be directed to a point of observation by using a deflecting element to deflect light; and the directivity of light can be improved while allowing the transmissivity at which light passes through the element for restricting the direction of light rays to be kept high and uniform by disposing an element for restricting the direction of light rays in the optical path of the light and restricting the traveling direction of the light to the direction parallel to the optical path. Brightness can thereby be made uniform with respect to the point of observation while the light utilization ratio is kept high.

DESCRIPTION OF THE PREFERRED EMBODIMENTS

Figure 1:
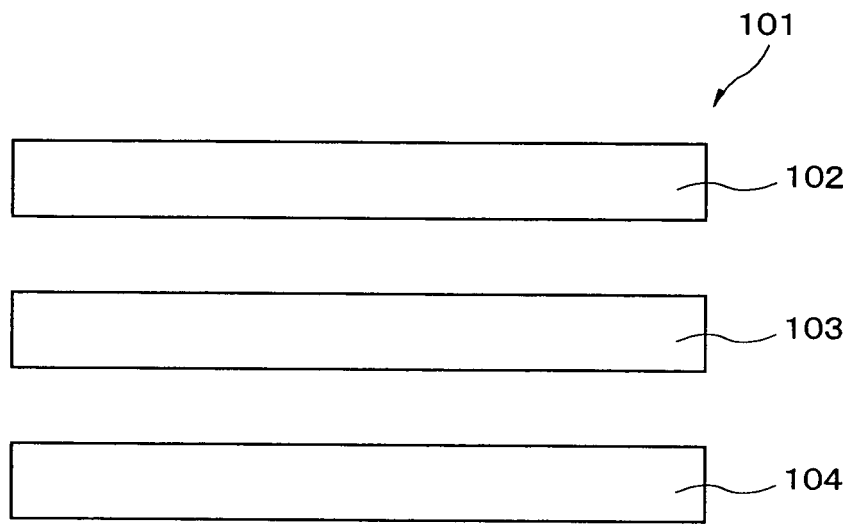
FIG. 1 is a cross-sectional diagram showing the conventional liquid crystal display apparatus with a controlled viewing angle cited in Japanese Laid-Open Patent Application No. 9-244018 (FIG. 3)
Figure 2:
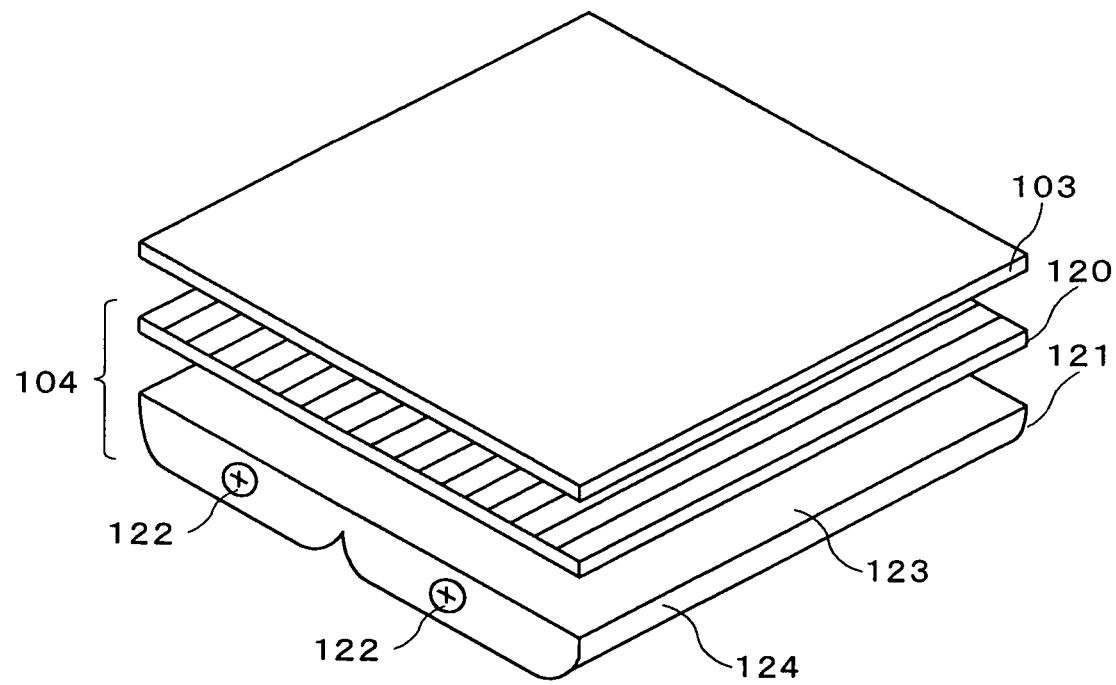
FIG. 2 is a perspective view showing an illumination device provided to the liquid crystal display with a controlled viewing angle.
Figure 3:
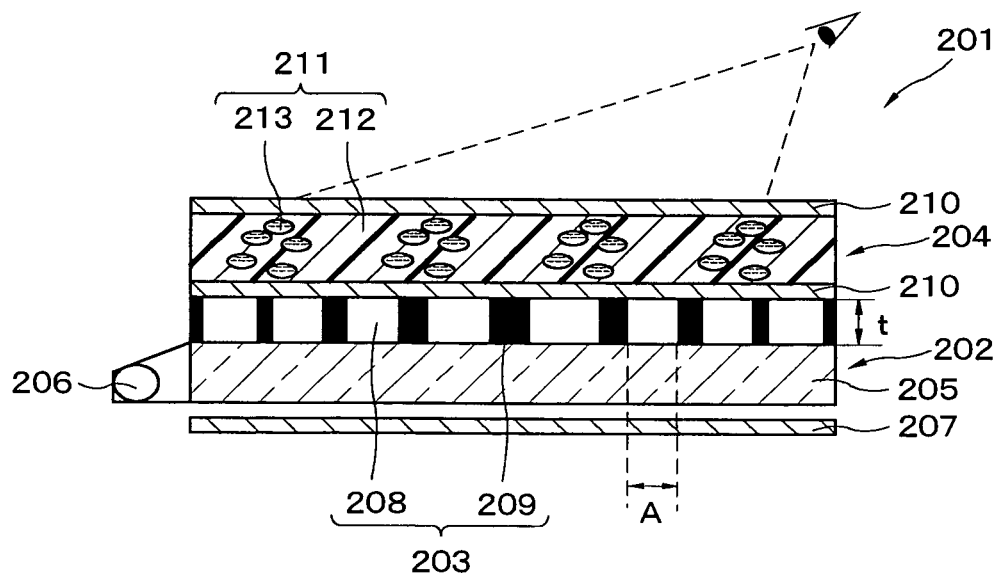
FIG. 3 is cross-sectional view showing the polymer-dispersed liquid crystal display cited in Japanese Laid-Open Patent Application No. 11-295705 (FIG. 8)
Figure 4:
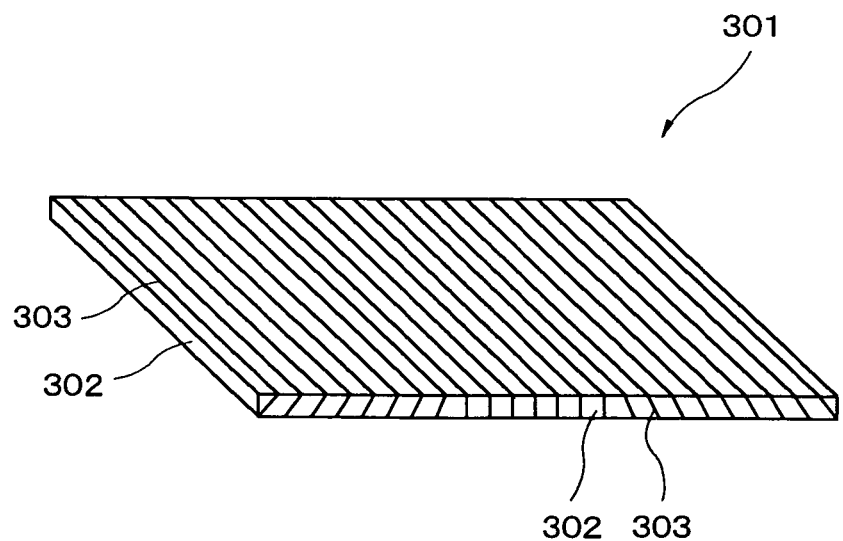
FIG. 4 is a perspective view showing the convergent louver cited in U.S. Pat. No. 3,919,559 (FIG. 7)
Figure 5:
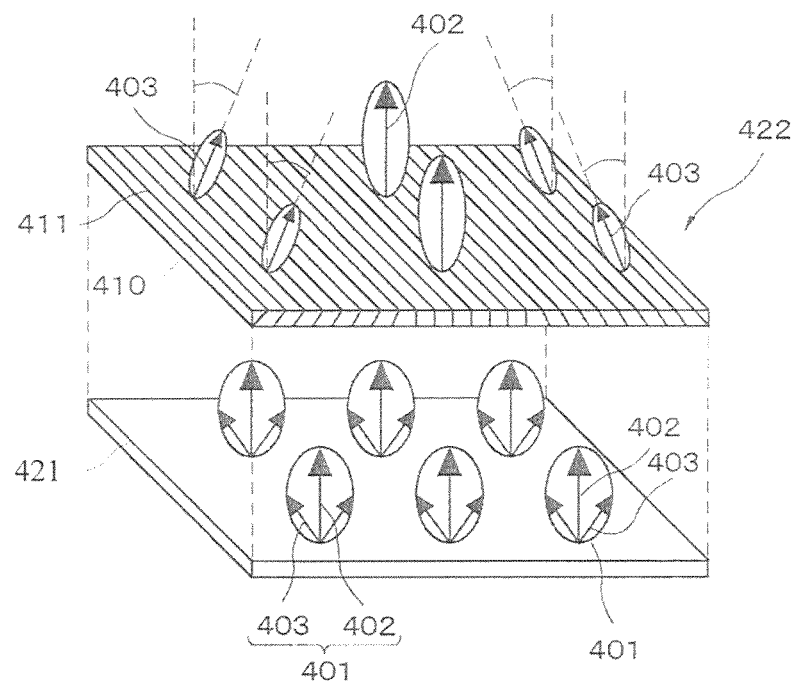
FIG. 5 is a perspective view schematically showing the operation of a light source apparatus provided with the convergent louver cited in U.S. Pat. No. 3,919,559 as an element for restricting the direction of light rays.
Figure 6:
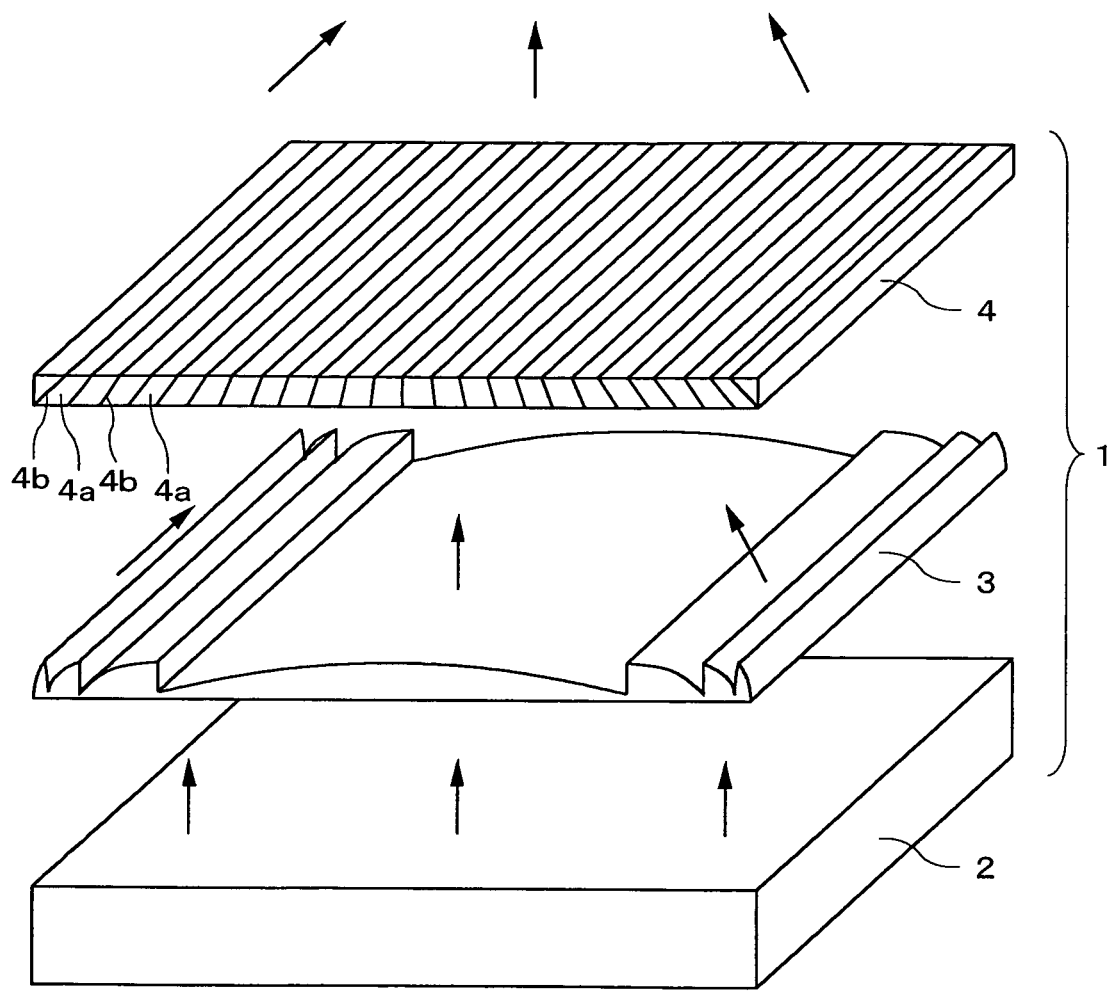
FIG. 6 is a perspective view showing the light source apparatus according to the first embodiment of the present invention.
Figure 7A:
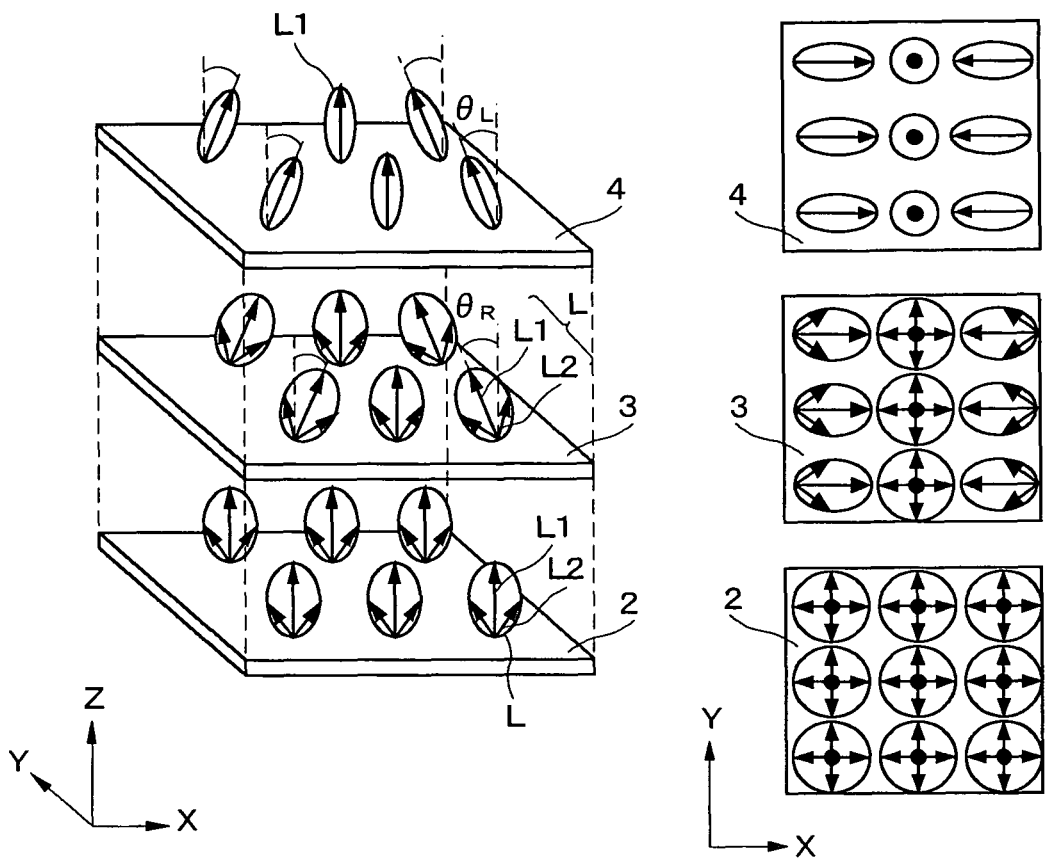
FIG. 7A is a perspective view and a plan view schematically showing the operation of the light source apparatus.
Figure 7B:
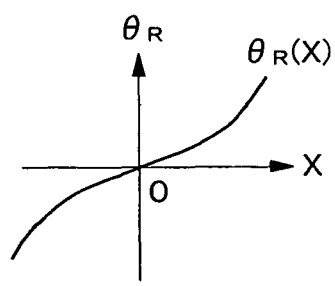
FIG. 7B is a graph showing the deflection characteristics of a Fresnel lens sheet, wherein the position in the luminous flux emitted from the Fresnel lens sheet is plotted on the horizontal axis, and the angle at which brightness is at its maximum is plotted on the vertical axis.
Figure 7C:
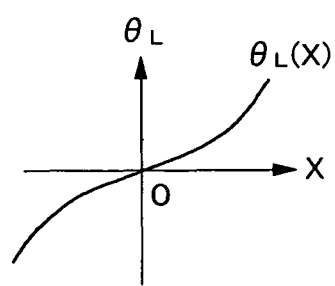
FIG. 7C is a graph showing the characteristics according to which the direction of light rays is restricted by a louver as an element for restricting the direction of light rays, wherein the position in the luminous flux emitted from the louver is plotted on the horizontal axis, and the angle at which brightness is at its maximum is plotted on the vertical axis.

Embodiments of the present invention are described in detail below with reference to the attached diagrams. First, the first embodiment of the present invention is described. FIG. 6 is perspective view showing the light source apparatus of the present embodiment. FIG. 7A is a perspective view and a plan view schematically showing the operation of the light source apparatus. FIG. 7B is a graph showing the deflection characteristics of a Fresnel lens sheet, wherein the position in the luminous flux emitted from the Fresnel lens sheet is plotted on the horizontal axis, and the angle at which brightness is at its maximum is plotted on the vertical axis. FIG. 7C is a graph showing the characteristics according to which the direction of light rays is restricted by a louver as an element for restricting the direction of light rays, wherein the position in the luminous flux emitted from the louver is plotted on the horizontal axis, and the angle at which brightness is at its maximum is plotted on the vertical axis.

In the light source apparatus 1 according to the present embodiment, a planar light source 2, a linear Fresnel lens sheet 3, and a louver 4 are disposed in the stated order, as shown in FIG. 6. The planar light source 2 emits light in the form of a plane. The light emitted from the planar light source 2 passes through the Fresnel lens sheet 3 and enters the louver 4. The Fresnel lens sheet 3 is a deflecting element that deflects light that is incident from the planar light source 2, and focuses the light in one dimension toward an imaginary straight line (focal line, not shown) that is outside the light source apparatus 1. The louver 4 is an element that is disposed in the optical path of the light emitted from the Fresnel lens sheet 3, and that restricts the direction of light rays and increases the directivity of the light by restricting the traveling direction of the light to the direction parallel to the optical path of the light.

The shape of the louver 4 is that of a sheet, and transmissive areas 4a and absorptive areas 4b are alternately arrayed. The transmissive areas 4a are areas for transmitting light, and the absorptive areas 4b are areas for absorbing light. The array direction of the transmissive areas 4a and absorptive areas 4b matches the focus direction of the Fresnel lens sheet 3. The angle formed between the surface of the louver 4 and the boundaries between the transmissive areas 4a and absorptive areas 4b (hereinbelow also referred to as transmission/absorption boundaries) varies depending on the position in the array direction in the louver 4. The angle in the center area in the array direction is a right angle, and the angle decreases going outward to both ends. The direction of the transmission/absorption boundaries is parallel to the optical path of the light that is focused by the Fresnel lens sheet 3. The optical member of the present embodiment is composed of a Fresnel lens sheet 3 and a louver 4.

Described next is the operation of the light source apparatus of the present embodiment configured in the manner described above. In the luminous flux L emitted from the planar light source 2, the strongest component is one oriented in the direction perpendicular to the light-emitting surface of the planar light source 2, as shown in FIG. 7A. In other words, the direction of the main light rays of the luminous flux L is the direction that is perpendicular to the light-emitting surface of the planar light source 2. In view of this fact, the component in this direction in the luminous flux L is referred to as the "principal-direction component L1," and the components other than the principal-direction component L1 in the luminous flux L are referred to as the "lateral-direction components L2."

The luminous flux L enters the Fresnel lens sheet 3. At this point, the luminous flux L is deflected at each position of the Fresnel lens sheet 3, and the traveling direction of the flux is changed. In other words, the angle of refraction $\theta_R$ is considerable at the two ends of the Fresnel lens sheet 3 as viewed in the focal direction, and the principal-direction component L1 of the luminous flux L is deflected toward the center area of the focal direction, as shown in FIG. 7B. At this time, the lateral-direction components L2 of the luminous flux L are deflected in the same direction as the principal-direction component L1. The angle of refraction $\theta_R$ is small in the center area of the Fresnel lens sheet 3 as viewed in the focal direction, and the principal-direction component L1 passes through the Fresnel lens sheet 3 unchanged without being deflected. As a result, the luminous flux L is focused in one dimension by passing through the Fresnel lens sheet 3.

The light emitted from the Fresnel lens sheet 3 enters the louver 4. The boundaries (transmission/absorption boundaries) between the transmissive areas 4a and absorptive areas 4b in the louver 4 are parallel to the optical path of the light focused by the Fresnel lens sheet 3, i.e., the traveling direction of the principal-direction component L1 of the luminous flux L, as shown in FIG. 7C. For this reason, the angle $\theta_L$ in which the direction of light rays is restricted has the same dependency as the angle of refraction $\theta_R$ in relation to the position in the X-axis direction. Within the luminous flux L, the principal-direction component L1 is substantially unabsorbed by the absorptive areas 4b and is transmitted by the louver 4, whereas the lateral-direction components L2 are absorbed and blocked by the absorptive areas 4b. The directivity of the luminous flux L is thereby increased.

More specifically, the principal-direction component L1 of the luminous flux L is substantially unabsorbed by the absorptive areas 4b, but the ratio of components that are not the principal-direction component L1 and are absorbed by the absorptive areas 4b increases in accordance with the incline of the traveling direction in relation to the traveling direction of the principal-direction component L1. The components (these components are referred to as "lateral-direction components L2") that travel in a direction inclined at a fixed angle or greater in relation to the traveling direction of the principal-direction component L1 are completely absorbed by the absorptive areas 4b. As a result, the traveling direction of the luminous flux L is restricted to a direction within a fixed range of angles about the traveling direction of the principal-direction component L1. In the present specification, such a phenomenon is described in the following manner, "the traveling direction of the luminous flux L is restricted to the traveling direction of the principal-direction component L1 of the flux."

The curve that shows the deflection characteristics of the Fresnel lens in FIG. 7B, and the curve that shows the characteristics according to which the light rays are restricted by the louver in FIG. 7C preferably match each other if equality is achieved between the index of refraction of the material constituting the Fresnel lens sheet 3 and the index of refraction of the material constituting the louver 4.

The effects of the present embodiment are described next. In accordance with the light source apparatus 1 of the present embodiment, light deflected in a prescribed direction can be emitted with high directivity. Using the light source apparatus 1 as a backlight of a transmissive liquid crystal display apparatus will therefore allow light to be directed to the front position of the transmissive liquid crystal display apparatus by being deflected with the aid of a Fresnel lens sheet 3. The directivity of light can be increased by restricting the traveling direction of the light with the aid of a louver 4. An image displayed on the transmissive liquid crystal display apparatus can thereby be visually confirmed from the front position, but the image cannot be visually confirmed from a diagonal position that is offset from the front position in the array direction. In this case, since there is a match between the traveling direction of the deflected light and the direction in which light rays are restricted by the louver 4, the transmissivity at which the light passes through the louver 4 can be increased and made uniform. The brightness of the screen as viewed from the front position can thereby be made uniform while the light utilization ratio is kept high.

Figure 8:
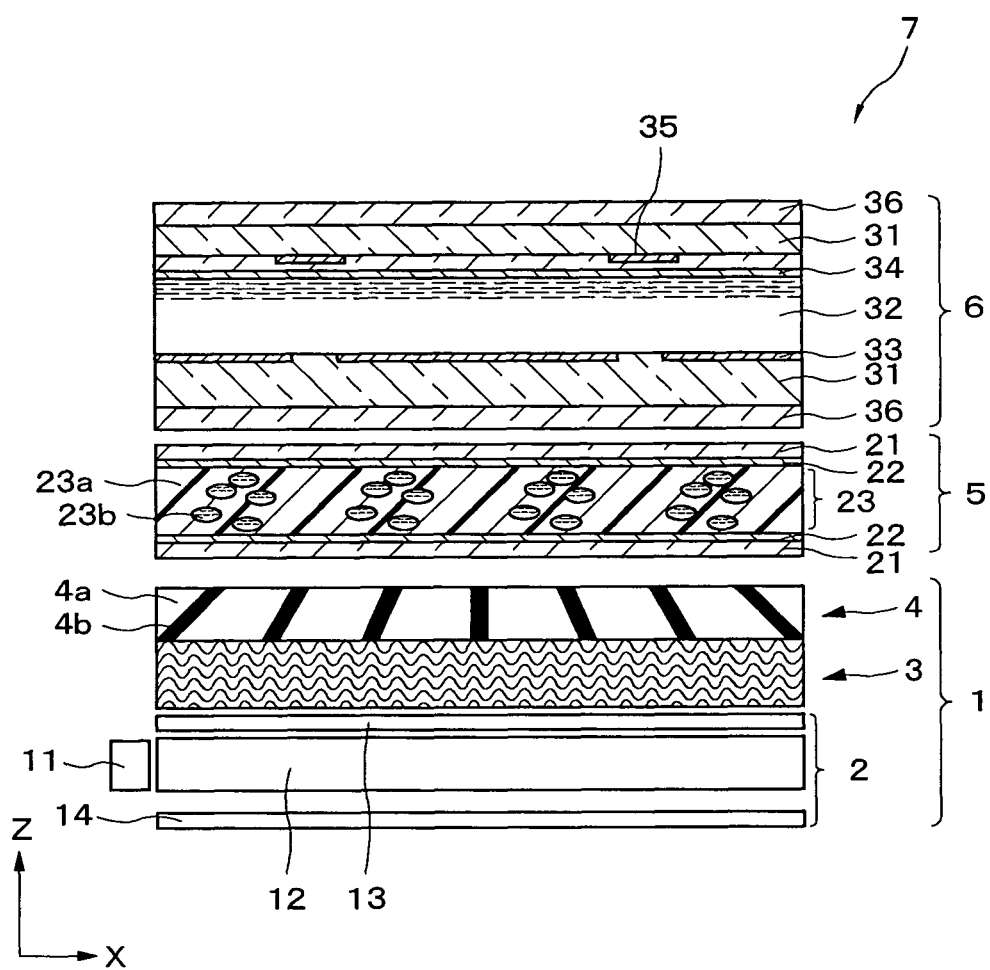
FIG. 8 is a cross-sectional view showing the display apparatus according to the second embodiment of the present invention.
Figure 9:
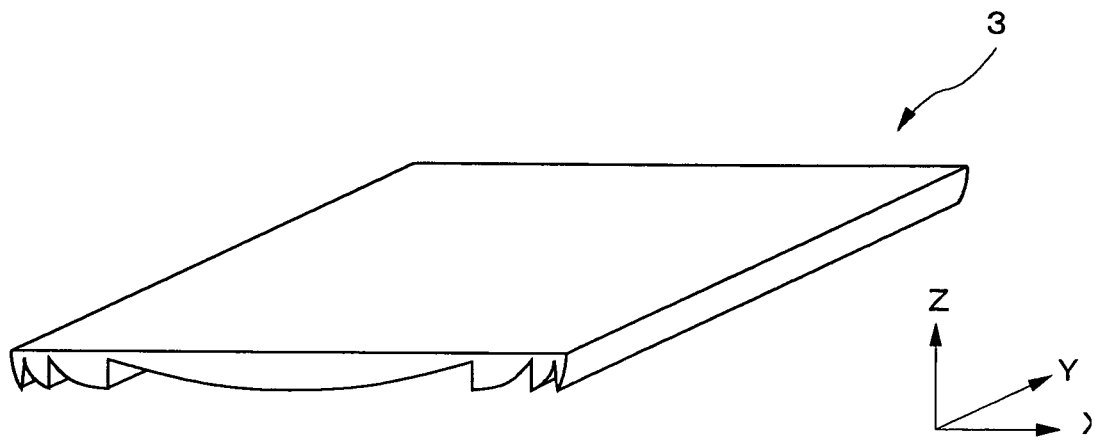
FIG. 9 is a perspective view showing the Fresnel lens in the display apparatus.
Figure 10:
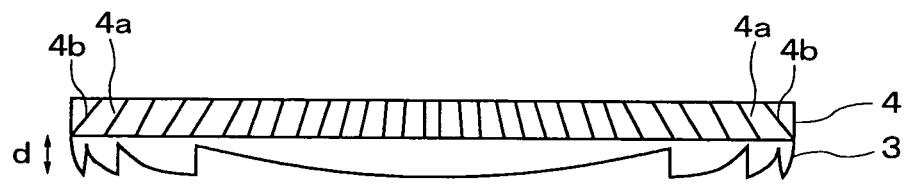
FIG. 10 is a side view showing the positional relationship between the Fresnel lens and the louver in the display apparatus.
Figure 11:
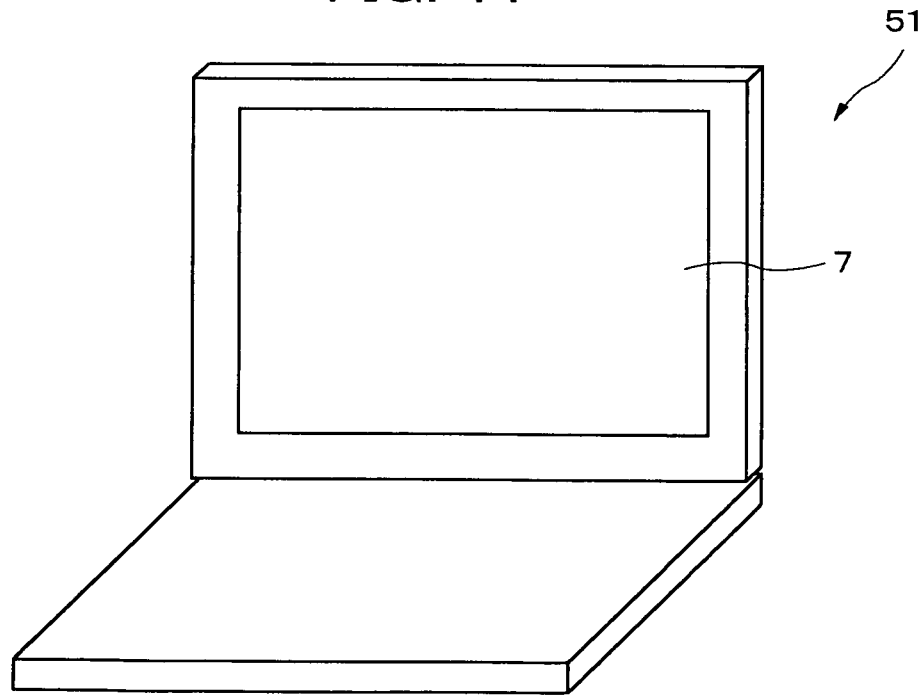
FIG. 11 is a perspective view showing the terminal apparatus of the present embodiment.

The second embodiment of the present invention is described next. FIG. 8 is a cross-sectional view showing the display apparatus of the present embodiment. FIG. 9 is a perspective view showing the Fresnel lens in the display apparatus. FIG. 10 is a side view showing the positional relationship between the Fresnel lens and the louver in the display apparatus. FIG. 11 is a perspective view showing the terminal apparatus of the present embodiment.

The display apparatus 7 of the present embodiment has a light source apparatus 1, transparent/scattering switching element 5, and transmissive liquid crystal display panel 6 in the stated order, as shown in FIG. 8. The light emitted from the light source apparatus 1 enters the liquid crystal display panel 6 via the transparent/scattering switching element 5. The liquid crystal display panel 6 is, for example, a panel with a 15-inch diagonal, and the size of the display area is 228 mm in the vertical direction and 304 mm in the horizontal direction.

The configuration of the light source apparatus 1 is the same as the first embodiment described above, excluding the fact that the machined surface of the lens of the Fresnel lens sheet 3 faces the planar light source 2. In other words, the planar light source 2 is provided to the apparatus, the Fresnel lens sheet 3 is disposed on the planar light source 2, and the louver 4 is disposed on the Fresnel lens sheet 3. The constituent elements are described in detail below.

The planar light source 2 has a light source 11, a light-guide plate 12 for propagating and planarly emitting light that has entered from the light source 11, a prism sheet 13 disposed on the light-emitting surface of the light-guide plate 12, and a reflective sheet 14 disposed on the side opposite from the prism sheet 13 as viewed from the light-guide plate 12. The light source 11 is a linear light source composed of a cold-cathode tube, and is disposed so as to face the side surface acting as the light-incident surface of the light-guide plate 12. The light-guide plate 12 is a matted-prism light-guide plate on which a matte finish (not shown) is formed on the surface (light-emitting surface) facing the prism sheet 13, and on which a row of prisms (not shown) are formed on the surface (light-scattering surface) facing the reflective sheet 14, which is the surface on the opposite side of the plate. The row of prisms extends in the direction that is parallel to the longitudinal direction of the light source 11, and is arrayed in the direction that is orthogonal to the longitudinal direction of the light source 11. The prism sheet 13 is disposed so that the prism surfaces face the light-guide plate 12, and the row of prisms of the prism sheet 13 is arrayed in the direction that is perpendicular to the longitudinal direction of the light source 11. Light that has leaked from the light-scattering surface of the light-guide plate 12 is reflected by the reflective sheet 14 toward the light-guide plate 12.

For the sake of convenience in the present specification, an XYZ rectangular coordinate system is established as described below. The direction facing away from the light source 11 to the light-guide plate 12 is defined as the +X direction, and the opposite direction is defined as the −X direction. The +X direction and the −X direction are generically referred to as the X-axis direction. Among the directions parallel to the light-emitting surface of the light-guide plate 12, the direction orthogonal to the X-axis direction is defined as the Y-axis direction. The direction orthogonal to both the X-axis direction and the Y-axis direction is defined as the Z-axis direction. The direction facing away from the light-scattering surface toward the light-emitting surface is the +Z direction, and the direction opposite thereto is the −Z direction. The +Z direction is the front surface direction, i.e., the direction facing the viewer. The +Y direction is part of a right-hand coordinate system. In other words, the thumb of a person's right hand is the +X direction, and the middle finger points in the +Z direction when the index finger is pointed in the +Y direction.

When the XYZ rectangular coordinate system is established as described above, the light-emitting surface of the light-guide plate 12 lies in the XY plane, the light source 11 is disposed in the −X direction as viewed from the light-guide plate 12, and the Fresnel lens sheet 3 is disposed in the +Z direction. Also, the Y-axis direction is the longitudinal direction of the prism row formed on the light-scattering surface of the light source 11 and light-guide plate 12, and is also the longitudinal direction of the prism row formed on the prism sheet 13; the X-axis direction is the array direction of the prism rows. The light source 11 is furthermore a scattering light source, and light emitted from the light source 11 is scattered in at least the XY directions inside the light-guide plate 12.

A flat plate portion composed of a transparent material is formed in the Fresnel lens sheet 3, and a linear Fresnel lens is formed on one side of the flat plate portion, as shown in FIGS. 9 and 10. The flat surface is disposed parallel to the XY plane, and the concavo-convex surface of the lens lies in the Z direction, i.e., facing the planar light source 2 side. The direction in which the concavities and convexities of the lens are arrayed is the X-axis direction. The flat surface of the Fresnel lens sheet 3 is in close contact with the louver 4.

The Fresnel lens sheet 3 is a type of Fresnel lens in which the depth of the grooves is fixed and the lens pitch is modulated. Since the depth d is fixed, the overall thickness is also fixed. The angle of refraction $\theta_R$ is small in the center area of the X-axis direction, and the angle of refraction $\theta_R$ is high at the two ends in the X-axis direction. The incident light can thereby be focused in the X-axis direction. In other words, light that passes through in the Z-axis direction is focused solely in the X-axis direction and is not focused in the Y-axis direction. The Fresnel lens sheet 3 thereby focuses light toward an imaginary straight line (focal line) that extends in the Y-axis direction outside of the display apparatus 7. The focal distance of the Fresnel lens sheet 3 is set at a point at which the observer of the display apparatus 7 is ordinarily positioned. This distance may, for example, be set to 600 mm. To facilitate machining, a transparent resin is advantageously used as the material of the light-guide plate 12 and Fresnel lens sheet 3. Polymethyl-methacrylate (PMMA) with a refractive index of 1.5 is used in the present embodiment.

Transmissive areas 4a that transmit light and absorptive areas 4b that absorb light are alternately disposed on the surface of the louver 4 in the direction parallel to the surface of the louver 4, as described above in the first embodiment. The array direction of the transmissive areas 4a and absorptive areas 4b is the X-direction. In the louver 4, the pitch between the centers of mass of the transmissive areas 4a and absorptive areas 4b is fixed at 90 μm, for example. In other words, when the positions of the centers of mass of the absorptive areas 4b in the ZX cross section of the louver 4 are defined as the intersections between the imaginary straight line which is equidistant from the upper and lower edges of the louver 4 and the center lines of the absorptive areas 4b, the positions of the centers of mass are arrayed at equal intervals along the X-direction, and the interval is 90 μm. The angle at which the transmission/absorption boundaries are sloped in the +Z direction varies depending on the position in the louver 4, and the transmission/absorption boundaries are sloped so as to be parallel to the viewing angle of an observer positioned in the front position.

The angle formed in the X-axis direction by the transmission/absorption boundaries and the +Z direction is calculated based on Snell's law. In other words, the excident angle $\theta_2$ is established so that the following equation holds true, wherein $n_1$ is the refractive index of the material of the Fresnel lens sheet 3, $\theta_1$ is the incident angle when light enters the louver 4 from the Fresnel lens sheet 3, $n_2$ is the refractive index of the material of the louver 4, $\theta_2$ is the excident angle of light from the Fresnel lens sheet 3 to the louver 4.

$$n_1 \times \sin\theta_1 = n_2 \times \sin\theta_2$$

In the present embodiment, the angle $\theta_2$ is about ±9.4 degrees in the edge portions of the screen in which the slope angle is greatest, and the angle $\theta_2$ is 0 degrees in the center portion of the screen. The height of the light-blocking layer is 300 μm, for example. In the present embodiment, the transmissive areas 4a of the louver 4 are formed from polymethylmethacrylate (PMMA) with a refractive index of 1.5.

A pair of transparent substrates 21 disposed parallel to each other is provided to the transparent/scattering switching element 5, as shown in FIG. 8, and an electrode 22 is disposed on each of the transparent substrates 21 on the surface that faces the other transparent substrate 21, so as to cover the surface of each of the transparent substrates 21. A PDLC (Polymer-Dispersed Liquid Crystal) layer 23 is disposed between the pair of transparent substrates 21, i.e., between the electrodes 22. Liquid crystal molecules 23b are dispersed in the polymer matrix 23a in the PDLC layer 23. The PDLC layer 23 is formed by exposing and curing a mixture of a photocurable resin and liquid crystal material, for example. In this manner, the transparent/scattering switching element 5 is configured so that the polymer/liquid crystal composite film is held by a pair of electrodes, and the polymer/liquid crystal composite film is configured so that liquid crystal droplets are contained in the polymer layer.

In the transparent/scattering switching element 5, the orientation of the liquid crystal molecules 23b in the PDLC layer 23 is varied by applying voltage to the PDLC layer 23 by using the pair of electrodes 22. When, for example, an electric field is not applied to the PDLC layer, the incident light is scattered and emitted in a scattered state because the perspective refractive indexes of the polymer matrix and the liquid crystal molecules are different. Conversely, when an electric field is applied to the PDLC layer, the perspective refractive indexes of the polymer matrix and the liquid crystal molecules are substantially the same, and the incident light is scattered only slightly and is allowed to pass through in a transparent state. The transparent/scattering switching element 5 thus scatters or transmits light that has entered from the louver 4, and emits the light to the transmissive liquid crystal panel 6.

A pair of transparent electrodes 31 is disposed in the liquid crystal display panel 6, and a liquid crystal layer 32 is disposed between these electrodes. Pixel electrodes 33 that outline the pixel area are disposed in the form of a matrix on the inner surface of one of the transparent electrodes 31, i.e., on the surface that faces the liquid crystal layer 32. A black matrix 35 and a shared electrode 34 for applying voltage to the liquid crystal layer 32 are disposed on the inner surface of the other transparent electrode 31. A polarizing plate 36 is furthermore disposed on outside surface of each of the transparent electrodes 31.

The terminal apparatus of the present embodiment is a notebook-type personal computer 51, as shown in FIG. 11. The display apparatus 7 of the present embodiment is mounted in the display unit of the notebook-type personal computer 51. The display apparatus 7 is disposed so that the horizontal and vertical directions of the display screen of the notebook-type personal computer 51 match the X-axis and Y-axis directions of the display apparatus 7. In other words, the light source 11 (see FIG. 6) is disposed to the side of the display screen in the notebook-type personal computer 51.

Described next is the operation of the display apparatus of the present embodiment configured in the manner described above. First, the light source 11 emits light, as shown in FIG. 8. The light enters the light-guide plate 12 from the side surface of the −X direction of the plate, and is propagated in the +X direction while being completely reflected by the surface of the +Z direction (light-emitting surface) and the surface of the −Z direction (light-scattering surface). In this situation, a portion of the light is offset from the total reflection condition by the matte finish formed on the light-emitting surface of the light-guide plate 12, and is emitted from the light-guide plate 12. Since the light emitted from the light-guide plate 12 deviates slightly from the total reflection condition of the light-guide plate 12 while propagating in the X-axis direction, the directivity in relation to the X-axis direction is increased to some extent, and the principal direction of the light is a direction inclined 65 degrees away from the +Z direction toward the +X direction.

This light enters the prism sheet 13, is refracted at the inclined surface of the prism on the incident side, is thereafter completely reflected by the inclined surface of the prism on the opposite side, and is emitted in the direction of the front surface. The principal direction of the light this thereby set in substantially the +Z direction. The extent to which the light emitted from the light-guide plate 12 is aligned with the Y-axis direction is also increased to some extent by forming a prism row on the surface of the light-guide plate 12 that faces the reflective sheet 14. As a result, the principal-direction component L1 of the luminous flux L emitted from the planar light source 2 is aligned with the +Z direction, as shown in FIG. 7A.

The light emitted from the planar light source 2 enters the Fresnel lens sheet 3. The operation in the Fresnel lens sheet 3 is the same as in the first embodiment described above. In other words, the light that has entered the Fresnel lens sheet 3 is refracted and deflected in the directions that are in accordance with the incident position, and is emitted toward the +Z direction. Since the Fresnel lens sheet 3 is linear, the light emitted from the Fresnel lens sheet 3 is focused in one dimension in the direction in which the concavities and convexities of the lower surface of the sheet are arrayed, i.e., the X-axis direction.

The light emitted from the Fresnel lens sheet 3 enters the louver 4. At this point, the incident light is refracted in accordance with the refraction index of the material of the Fresnel lens sheet 3, and also in accordance with the refraction index of the material of the transmissive areas 4a of the louver 4. The operation in the louver 4 is the same as in the first embodiment described above. In other words, the direction of the light that enters the louver 4 is restricted by the absorptive areas 4b, and the directivity of the light is increased. At this point, the direction in which the light is restricted by the louver 4 matches the direction of the principal-direction component L1 of the luminous flux L focused by the Fresnel lens sheet 3. Therefore, only the principal-direction component L1 of the luminous flux L is emitted from the louver 4. The highly directed light emitted from the louver 4 enters the transparent/scattering switching element 5.

In the case that the wide-viewing-angle display is used, voltage is not applied to the PDLC layer 23. For this reason, the PDLC layer 23 is set in a state in which the liquid crystal molecules 23b in the polymer matrix 23a are randomly dispersed. Therefore, the light that has entered the transparent/scattering switching element 5 is uniformly scattered by the PDLC layer 23 and is dispersed over a wide range. In other words, light whose directivity has been increased by the louver 4 is scattered by the transparent/scattering switching element 5, the directivity of the light is reduced, and the light is dispersed over a wide angle. The light distributed over a wide range enters the liquid crystal display panel 6, an image is added by passage through the liquid crystal display panel 6, and the light is thereafter emitted directly over the wide angle. An image is thus displayed with a wide viewing angle.

In the case that the narrow-viewing-angle display is used, voltage is applied to the PDLC layer 23. The liquid crystal molecules 23b dispersed in the polymer matrix 23a are oriented by the voltage, and the PDLC layer 23 is brought to a transparent state. Therefore, the light that has entered the transparent/scattering switching element 5 passes through unchanged. In other words, the light whose directivity has been increased in the X-axis direction by the louver 4 is emitted from the transparent/scattering switching element 5 in a state in which the directivity is maintained. This highly directed light enters the liquid crystal display panel 6, an image is added by passage through the liquid crystal display panel 6, and the light is thereafter emitted in an unchanged, highly directed state. In this manner, an image is displayed with a narrow viewing angle.

The effects of the present embodiment are described next. In the present embodiment, it is possible to switch between the wide-viewing-angle display and the narrow-viewing-angle display because a transparent/scattering switching element 5 is provided. In the notebook-type personal computer 51 shown in FIG. 11, the X-axis direction of the light source 11 is parallel to the screen. Therefore, it is possible to switch between the wide-viewing-angle display and narrow-viewing-angle display along a direction parallel to the screen. For this reason, if the wide-viewing-angle display is used, a plurality of viewers aligned in the parallel direction can view the same image. If the narrow-viewing-angle display is used, only the viewer in the front position can view the image, and unwanted viewing from the left and right of the viewer can be prevented.

When the narrow-viewing-angle display is used, light can be brought from all areas of the screen to the front position because the light emitted from the planar light source 2 is focused by the Fresnel lens sheet 3 toward the front position. Also, at this point, the louver 4 can increase the directivity of light by restricting the traveling direction of light. The viewing angle can thereby be more effectively narrowed. Furthermore, since there is a match between the traveling direction of the focused light and the direction of the light rays restricted by the louver 4, the transmissivity at which the light passes through the louver 4 can be enhanced and made more uniform. The brightness of the screen as viewed from the front position can be made uniform while the light utilization ratio is kept high. In the monitor of a personal computer or the like, the shape of the display area is ordinarily a rectangle whose dimension in the horizontal direction is greater than the dimension in the vertical direction, so this effect is particularly considerable. Moreover, the absorption loss of light in the absorptive areas 4b of the louver 4 is low in the present embodiment, and a display apparatus with low power consumption can therefore be obtained.

It is assumed in the present embodiment that the light emitted by the planar light source 2 has some directivity. If a light source that emits perfectly isotropic light is used as the planar light source, the brightness at the edge portions of the display screen will not be reduced even if louver alone is provided without the use of a deflecting element. This is because the magnitudes of the principal-direction component L1 and lateral-direction components L2 of the luminous flux L are equal to each other. However, if such an isotropic light source were used, the ratio of light that is blocked by the louver would be higher, and the light utilization ratio would therefore be significantly reduced. For this reason, the planar light source preferably has some amount of directivity.

It is also possible to consider dispensing with the louver by allowing a light source in which the emitted light has very high directivity to serve as the planar light source. However, irrespective of the extent to which the directivity of the planar light source is increased, a very small amount of light will be emitted in directions that are significantly inclined from the principal direction of the emitted light. This is caused by the internal scattering or other factors in the light-guide plate. In other words, the brightness distribution of the planar light source has a smooth distribution, and there is a small amount of brightness even in areas that are away from the peak of the brightness distribution. For this reason, even with the use of a planar light source that has very high directivity, the direction of light rays cannot be effectively restricted with a only planar light source and a deflecting element even if the viewability from the front position is improved by increasing the front-surface brightness, and the performance of the viewing angle control is poor. For this reason, unwanted viewing cannot be effectively prevented, and a louver is therefore required.

Also, the light source apparatus 1 can be made thinner in the present embodiment because a Fresnel lens sheet is used as the deflecting element. As a result, a light source apparatus 1 and a notebook-type personal computer 51 provided with the display apparatus 7 can also be made thinner.

Furthermore, the flat surface of the Fresnel lens sheet 3 in the present embodiment is in close contact with the surface of the louver 4. For this reason, the light source apparatus 1 can be made even thinner, the mechanical strength of the light source apparatus 1 can be improved, and loss that occurs when light propagates from the Fresnel lens sheet 3 to the louver 4 can be reduced.

Moreover, the luminous energy of the light source can be increased in the present embodiment because the light source does not need to be arranged as a point light source, a plurality of light sources can be arranged on the light incident surface of the light-guide plate. The brightness of the screen can thereby be further improved.

Shown in the present embodiment is an example in which a laterally positioned light source having a cold-cathode tube is used as the planar light source, but the present invention is not limited to this light source, and a rearwardly positioned light source having a cold-cathode tube may be used as the light source. LEDs (Light-Emitting Diode) or other point light sources may be used in place of the cold-cathode tube. A plurality of LEDs may be disposed along the light-incident surface of the light-guide plate.

The luminous energy of the light source can be adjusted so that the front-surface brightness of the transmissive liquid crystal panel is about the same in the narrow-viewing-angle display and the wide-viewing-angle display. The screen brightness of the transmissive liquid crystal panel can be kept constant, and discomfort when switching between the narrow-viewing-angle display and wide-viewing-angle display can be reduced. In cases in which the light source is composed of white LEDs, and each of the white LEDs is composed of a blue LED and a yellow fluorescent body, the luminous energy of the white LEDs can be adjusted by the pulse width modulation of the electric current. In a white LED composed of a blue LED and a yellow fluorescent body, the yellow fluorescent body is excited by a portion of the blue light emitted by the blue LED, and yellow light is emitted. The blue light and yellow light are mixed to produce white light. When the amount of electric current is adjusted so that the front-surface brightness of the transmissive liquid crystal panel in the narrow-viewing-angle display has the same value as during wide-viewing-angle display, the chromaticity of the image varies because of variations in the luminescence ratio of the blue light and yellow light. In contrast, when the luminous energy is adjusted by pulse modulation, the variability in the chromaticity of the image can be reduced because the luminous energy can be adjusted by adjusting the ratio of the time during which light is emitted.

Furthermore, the display panel is not limited to a liquid crystal display panel, and the invention can be used with any display panel that uses a light source apparatus. Also, the liquid crystal display panel is not limited to a transmissive-type, and the invention can be used with any panel that has a transmissive area in each pixel. It is possible to use a very-low-reflection liquid crystal panel, a very-low-transmission liquid crystal panel, or a semi-transmissive liquid crystal panel having a reflective area in a portion of the pixels. A liquid crystal panel having low viewing angle dependency is preferred. Gradation inversion can thereby be reduced during wide-viewing-angle display. Examples of a liquid crystal panel mode with a transverse electric field mode include the IPS (In-Plane Switching) method, the FFS (Fringe Field Switching) method, and the AFFS (Advanced Fringe Field Switching) method. Examples with a vertical orientation mode include the MVA (Multi-Domain Vertical Alignment) method in which multiple domains are created and viewing angle dependency is reduced, the PVA (Patterned Vertical Alignment) method, and the ASV (Advanced Super V) method. Advantageous application can also be made to liquid crystal display panels with a film-compensated TN mode.

The transparent/scattering switching element is not limited to one being provided with a PDLC layer, and any element that can switch between a transparent state and a scattering state can be appropriately used. Examples include an element in which a polymer network liquid crystal (PNLC) is used, and an element in which dynamic scattering (DS) is used. In the PDLC layer described above, a scattering state is established when voltage is not applied, and a transparent state is established when voltage is applied. Since the transparent/scattering switching element does not consume power in the scattering state, the saved power can be allocated to the backlight light source, and the brightness of the light source apparatus can be improved in the scattering state. As a result, compensation can be made for the insufficient brightness of the wide-viewing-angle display. However, the present invention is not limited to this configuration, and a PDLC layer may be used in which a transparent state is established when voltage is not applied, and a scattering state is established when voltage is applied. Such a PDLC layer is obtained by photo-curing while voltage is being applied. The need to apply voltage to the PDLC layer when the narrow-viewing-angle display is frequently used in a mobile information terminal can thereby be dispensed with, and power consumption can be reduced. A cholesteric liquid crystal, a ferroelectric liquid crystal, or the like may serve as the liquid crystal molecule that is used in the PDLC layer. Even when the applied voltage is switched off, these liquid crystals have memory and remain in an oriented state when voltage is not applied. Power consumption can be reduced by using such a PDLC layer. The transparent/scattering switching element may furthermore be one in which polymer fibers, beads, or the like are added to the liquid crystal, one in which encapsulated liquid crystal droplets are embedded in the polymer layer, or one in which the polymer matrix is impregnated with liquid crystal.

In the present embodiment, an example was described in which the light source 11 of the planar light source 2 is disposed in the −X direction as viewed from the light-guide plate 12, and the horizontal direction of the display screen of the notebook-type personal computer is the X-axis direction, but the present invention in not limited to this configuration, and the planar light source may be kept in a state rotated by 90 degrees in the XY plane shown in FIG. 8, and the light source 11 may be aligned with the Y-axis direction as viewed from the light-guide plate 12. When this light source apparatus is mounted in the terminal apparatus, the light source 11 can be placed above or below the screen, and the terminal apparatus casing can be made thinner. This option can thereby be made particularly useful in mobile phones and other small terminal apparatuses. The array direction may be rotated and aligned with the XY plane. The moiré phenomenon that occurs between the louver and the display panel can thereby be made less noticeable, and the display quality can be improved.

In the present embodiment, an ordinary lens or the like may be used as the focusing member in place of the Fresnel lens sheet. However, a Fresnel lens is preferably used from the standpoint of making the apparatus thinner. The Fresnel lens may be mounted facing upward or downward. In the particular case that the lens is mounted facing downward, good light transmittance can be obtained by bringing the lens into close contact with the louver surface.

Spherical aberration can be reduced and light can be efficiently focused by providing the Fresnel lens with an aspherical shape. Also, if the Fresnel lens is fabricated by exposure, it is possible to achieve very high pitch accuracy.

Figure 12:
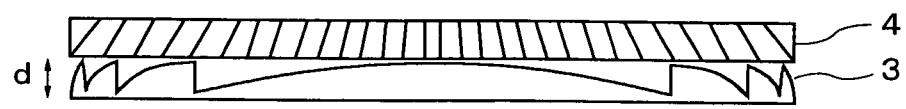
FIG. 12 is a side view showing the positional relationship between the Fresnel lens and the louver in the first modified example of the second embodiment.

Described next is the first modified example of the second embodiment. FIG. 12 is a side view showing the positional relationship between the Fresnel lens and the louver in the modified example. In the modified example, the Fresnel lens sheet 3 is disposed so that the machined surface of the lens faces the louver 4 side, as shown in FIG. 12. In accordance with the modified example, the effect of the interference fringe produced between the louver 4 and Fresnel lens sheet 3 can be reduced and the image quality can be improved. The configuration, operation, and effects other than those described above in connection with the modified example are the same as those of the second embodiment described above.

Figure 13:
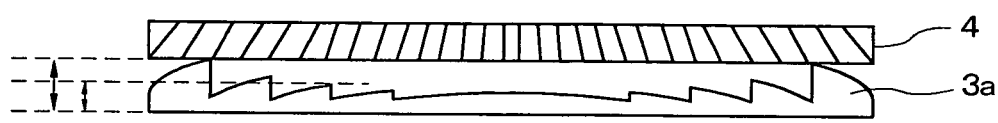
FIG. 13 is a side view showing the positional relationship between the Fresnel lens and the louver in the second modified example of the second embodiment.

Described next is a second modified example of the present second embodiment. FIG. 13 is a side view showing the positional relationship between the Fresnel lens and the louver in the modified example. A Fresnel lens sheet with equal groove depths and a modulated pitch is provided as a focusing element in the second embodiment and the first modified example thereof described above. In contrast, in the modified example, a Fresnel lens sheet 3a with a modulated groove depth is provided, as shown in FIG. 13. The edge portion has deeper grooves than does the center area of the Fresnel lens sheet 3a, for example. In the modified example, since the Fresnel lens sheet 3a has grooves that are deeper at the edge portions than in the center area, the louver 4 and the Fresnel lens sheet 3a do not come close together in areas other than the two edge portions. Sufficient space can be provided between the louver 4 and Fresnel lens sheet 3a in the main area symmetrical about the center area of the screen, and the occurrence of Newton rings and other interference fringes can be reduced. A higher image quality is made possible as a result. The configuration, operation, and effects other than those described above in connection with the modified example are the same as those of the second embodiment described above.

Figure 14:
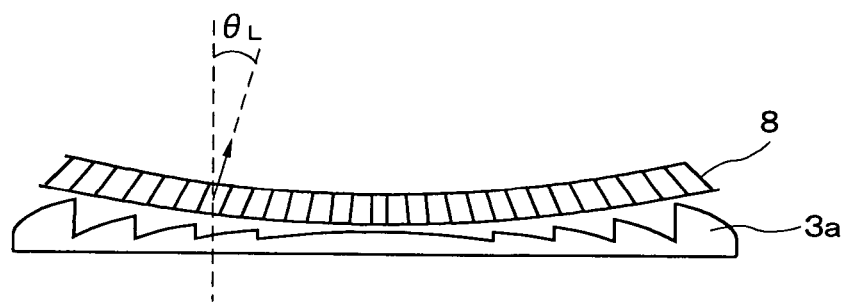
FIG. 14 is a side view showing the positional relationship between the Fresnel lens and the louver in the third modified example of the second embodiment.

Described next is a third modified example of the present second embodiment. FIG. 14 is a side view showing the positional relationship between the Fresnel lens and the louver in the modified example. In the modified example, a Fresnel lens sheet 3a in which the depth of the grooves has been modulated is provided as the focusing element, as shown in FIG. 14. A louver 8 in which the transmission/absorption boundaries are disposed directly above the sheet surface is provided in a curved state along the lens surface of the Fresnel lens sheet 3a. The configuration and operation other than that described above in connection with the modified example are the same as those of the second embodiment described above.

In accordance with the modified example, optical characteristics that are equivalent to those of the louver 4 in the second embodiment described above can be realized by curving the louver 8 in which the transmission/absorption boundaries are disposed directly above the sheet surface. The louver 8 in which the transmission/absorption boundaries are disposed directly above the sheet surface can be more easily obtained as a commercial product than a louver in which the transmission/absorption boundaries are inclined from the normal direction of the sheet surface. Therefore, the light source apparatus can be easily manufactured and costs can be reduced.

Figure 15:
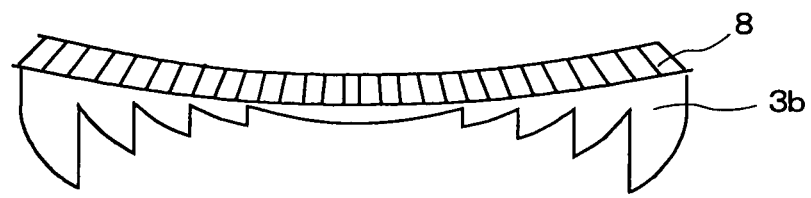
FIG. 15 is a side view showing the positional relationship between the Fresnel lens and the louver in the fourth modified example of the second embodiment.

Described next is a fourth modified example of the present second embodiment. FIG. 15 is a side view showing the positional relationship between the Fresnel lens and the louver in the modified example. In comparison with the third modified example of the second embodiment described above, this modified example is different in that a Fresnel lens sheet 3b is provided as the focusing element in which the non-machined surface is curved, and the louver 8 is in close contact with the non-machined surface of the Fresnel lens sheet 3b, as shown in FIG. 15. The loss of light between the louver 8 and the Fresnel lens sheet 3b can thereby be reduced. The configuration, operation, and effects other than those described above in connection with this modified example are the same as those of the third modified example of the second embodiment described above.

Figure 16:
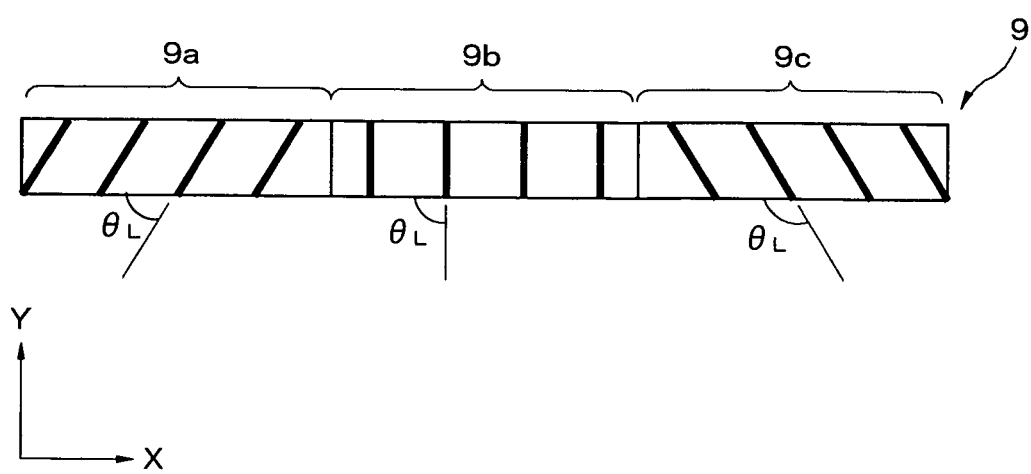
FIG. 16 is a side view showing the louver in the fifth modified example of the second embodiment.

Described next is a fifth modified example of the present second embodiment. FIG. 16 is a side view showing the louver in the modified example. In this modified example, a louver 9 in which a plurality; e.g., three, of types of sections are combined is provided as the louver, as shown in FIG. 16. In each of the sections 9a, 9b, and 9c of the louver 9, the angles $\theta_L$ formed by the transmission/absorption boundaries and the surface of the louver are different from each other, and the angle $\theta_L$ in each of the sections is fixed. In other words, the angle $\theta_L$ is less than 90 degrees in the section 9a positioned in the end area toward the −X direction. The angle $\theta_L$ is 90 degrees in the section 9b positioned in the center area. The angle $\theta_L$ is greater than 90 degrees in the section 9c positioned in the end area disposed in the +X direction. The absolute value $|\theta_L-90|$ is the same for the section 9a and the section 9c. A commercially available section can be used as each of the sections 9a, 9b, and 9c constituting the louver 9. Features other than those described above in connection with this modified example are the same as that in the second embodiment described above.

In the modified example, substantially the same effects as in the second embodiment described above can be obtained because the direction in which light rays are restricted, i.e., the transmission/absorption boundaries in the louver 9 substantially match the principal direction of light focused by the Fresnel lens sheet 3. In comparison with the second embodiment, however, the offset between the direction in which light rays are restricted by the louver 9 and the principal direction of light focused by the Fresnel lens sheet 3 is slightly greater in the modified example, and the light utilization ratio and brightness at the edge portions of the screen are slightly reduced by an equivalent amount. However, the cost of the louver can be reduced because commercially available louvers can be used in each of the sections 9a, 9b, and 9c in the louver 9 of the modified example. It is also possible to fabricate a louver by combining four or more types of sections.

Figure 17:
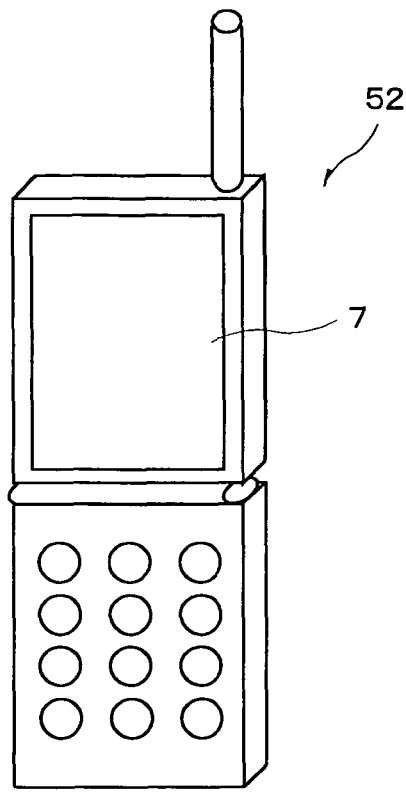
FIG. 17 is a perspective view showing the terminal apparatus according to the sixth modified example of the second embodiment.

Described next is a sixth modified example of the present second embodiment. FIG. 17 is a perspective view showing the terminal apparatus of the modified example. An example of a notebook-type personal computer is described in the second embodiment above, but in the present embodiment, the terminal apparatus is a mobile phone 52, as shown in FIG. 17. The display apparatus 7 of the second embodiment described above is mounted in the display unit of the mobile phone 52. The operation and effects in the modified example are the same as those of the second embodiment described above.

The terminal apparatus of the present invention is not limited to a notebook-type personal computer and a mobile phone, and can be any terminal apparatus as long as the apparatus has a display unit. Examples include television receivers, desktop personal computers, ATMs, automatic vending machines, onboard television receivers, PDAs, game machines, digital video cameras, digital cameras, and video players. The display apparatus of the present invention can be effectively used as a wide-display apparatus such as a monitor for a personal computer, but the display apparatus may also be mounted on a small-display apparatus.

Figure 18:
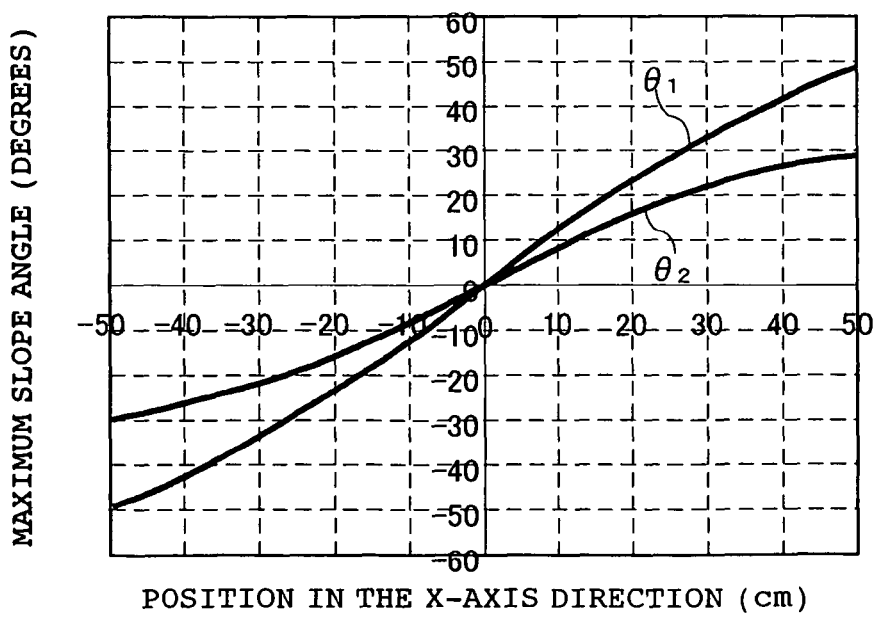
FIG. 18 is a graph showing the position dependency of the maximum slope angle of the transmission/absorption boundaries, wherein the position in the X-axis direction is plotted on the horizontal axis, and the maximum slope angle of the transmission/absorption boundaries between the optical path and the louver is plotted on the vertical axis.
Figure 19:
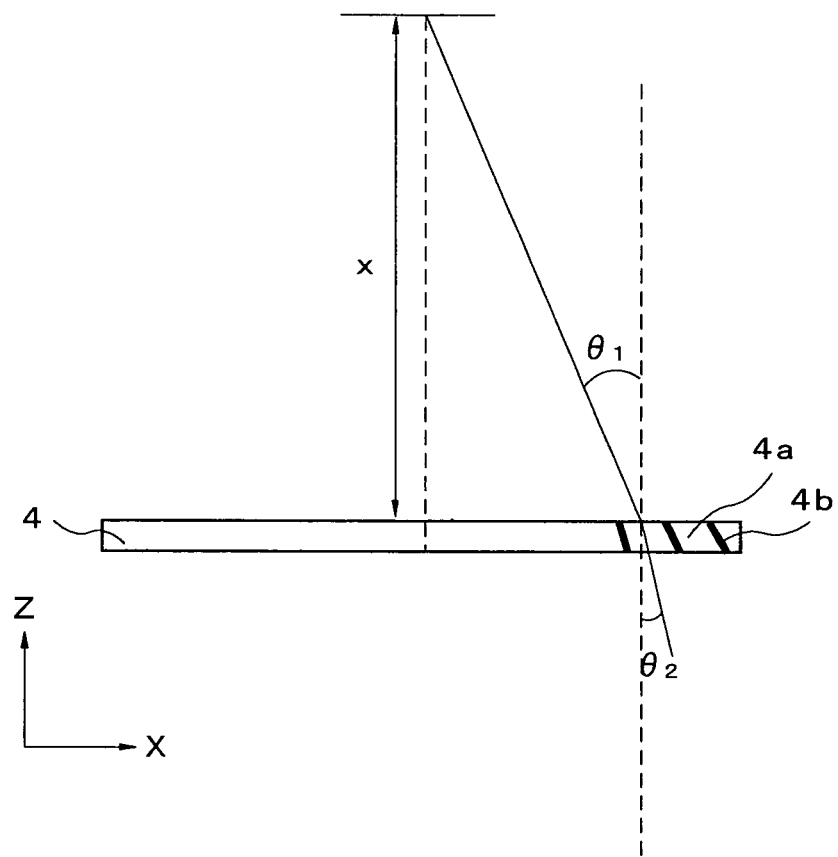
FIG. 19 is a diagram showing the computing conditions of TABLE 1 and FIG. 18.

However, the panel size of the mounted display apparatus varies depending on the type of the terminal apparatus. When the panel size of the display apparatus is different, the slope angle of the optical path is different. TABLE 1 shows screen sizes and the distances between the screen and the point of observation for typical terminal apparatuses, and shows the maximum slope angle of the optical path in each case. FIG. 18 is a graph showing the position dependency of the maximum slope angle of the transmission/absorption boundaries, wherein the position in the X-axis direction is plotted on the horizontal axis, and the maximum slope angle of the transmission/absorption boundaries between the optical path and the louver is plotted on the vertical axis. FIG. 19 is a diagram showing the computing conditions of TABLE 1 and FIG. 18.

As shown in FIG. 19, x (cm) is the distance to the point of observation, i.e., the distance between the focal point of the Fresnel lens sheet and the louver, $\theta_2$ is the angle formed between the louver surface and the transmission/absorption boundaries in the louver, and $\theta_1$ is the excident angle of light emitted from the louver. The angle $\theta_2$ is equal to the angle formed between the louver surface and the traveling direction of light in the louver. Also, the Fresnel lens sheet and the louver are assumed to be in perfect close contact. The refractive index of the transmissive areas of the louver is assumed to be 1.5, and the refractive index of air is assumed to be 1.0. The aspect ratio of the display area is 4:3, and the horizontal direction of the screen is defined to be the lengthwise direction of the display area.

TABLE 1

| APPLICATION | SCREEN SIZE | | | DISTANCE x (cm) | ANGLE $\theta_2$ (DEGREES) |
| | DIAGONAL (inch) | VERTICAL (cm) | HORIZONTAL (cm) | | |
| --- | --- | --- | --- | --- | --- |
| TELEVISION | 17~ | 25.9~ | 34.5~ | 100.0 | ~6.5 |
| NOTEBOOK PC | 10~17 | 15.2~25.9 | 20.3~34.5 | 60.0 | ~10.6 |
| ATM | 7~12 | 10.7~18.3 | 14.2~24.4 | 60.0 | ~7.6 |
| ONBOARD TELEVISION | 5~7 | 7.6~10.7 | 10.2~14.2 | 60.0 | ~4.5 |
| PDA | 3~5 | 4.6~7.6 | 6.1~10.2 | 45.0 | ~4.3 |
| MOBILE PHONE | 2~3 | 3.0~4.6 | 4.1~6.1 | 45.0 | ~2.6 |

Figure 20:
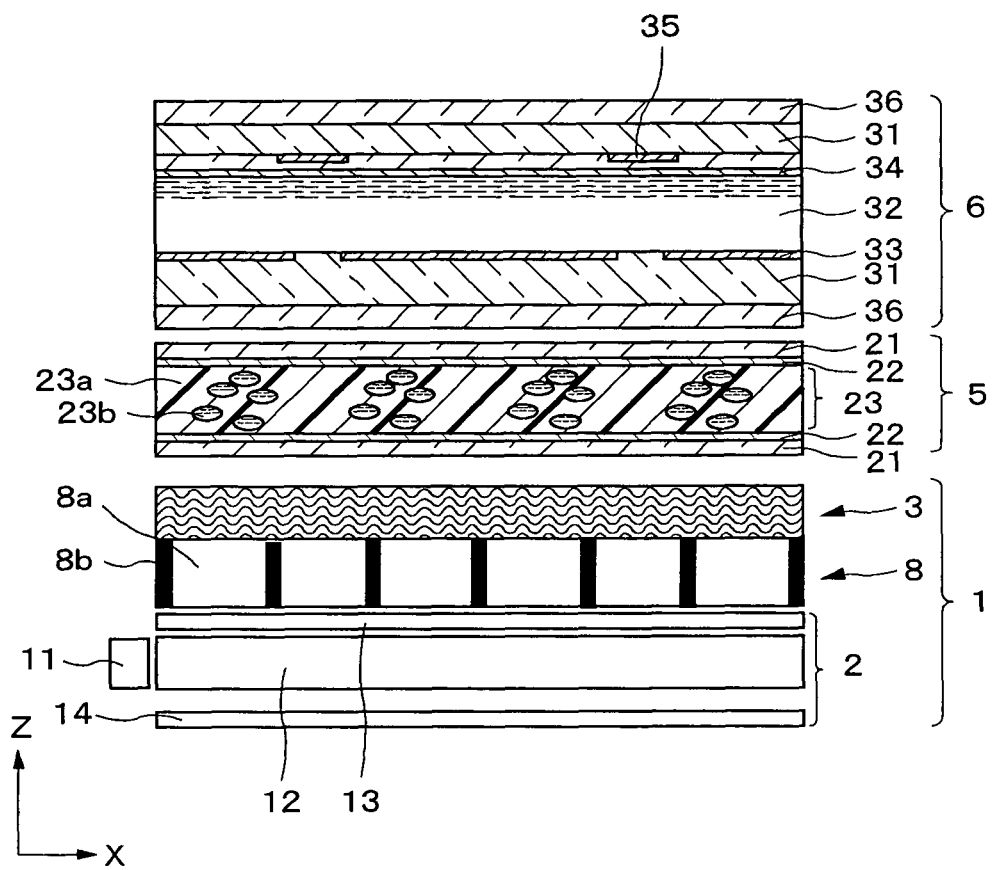
FIG. 20 is a cross-sectional view showing the display apparatus according to the third embodiment of the present invention.
Figure 21:
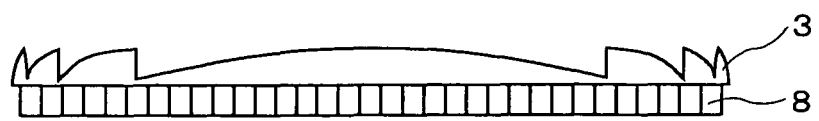
FIG. 21 is a side view showing the positional relationship between the Fresnel lens sheet and the louver in the display apparatus.
Figure 22A:
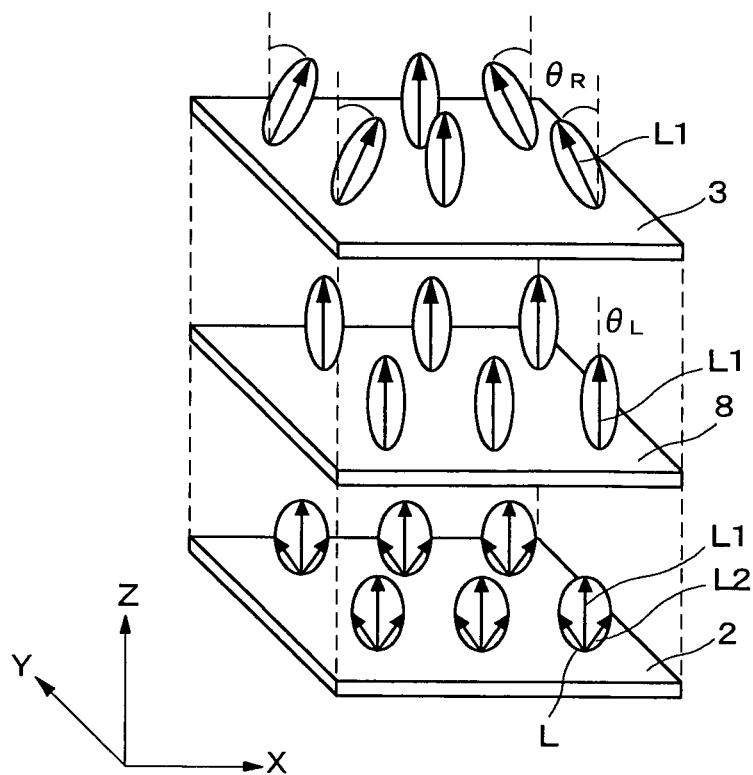
FIG. 22A is a perspective view that schematically shows the operation of the light source apparatus.
Figure 22B:
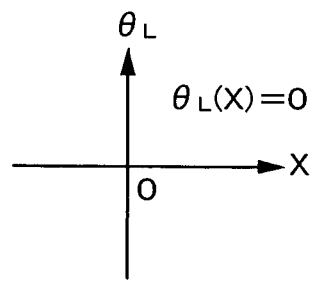
FIG. 22B is a graph showing the characteristics according to which the direction of light rays is restricted by a louver, wherein the X-axis coordinate in the luminous flux emitted from the louver is plotted on the horizontal axis, and the angle at which brightness is at its maximum is plotted on the vertical axis.
Figure 22C:
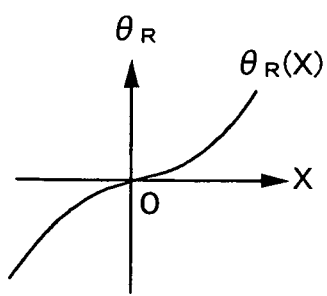
FIG. 22C is a graph showing the deflection characteristics of a Fresnel lens, wherein the X-axis coordinate in the luminous flux emitted from the Fresnel lens sheet is plotted on the horizontal axis, and the angle at which brightness is at its maximum is plotted on the vertical axis.

The third embodiment of the present invention is described next. FIG. 20 is a cross-sectional view showing the display apparatus of this embodiment. FIG. 21 is a side view showing the positional relationship between the Fresnel lens sheet and the louver in the display apparatus. FIG. 22A is a perspective view that schematically shows the operation of the apparatus; FIG. 22B is a graph showing the characteristics according to which the direction of light rays is restricted by a louver, wherein the X-axis coordinate in the luminous flux emitted from the louver is plotted on the horizontal axis, and the angle at which brightness is at its maximum is plotted on the vertical axis; and FIG. 22C is a graph showing the deflection characteristics of a Fresnel lens, wherein the X-axis coordinate in the luminous flux emitted from the Fresnel lens sheet is plotted on the horizontal axis, and the angle at which brightness is at its maximum is plotted on the vertical axis.

The light source apparatus of the present embodiment is configured so that the order in which the Fresnel lens sheet and the louver are stacked is reversed in comparison with the light source apparatus of the second embodiment described above, as shown in FIGS. 20 and 21. In other words, the louver 8 is disposed facing the planar light source 2, and the Fresnel lens sheet 3 is disposed facing the transparent/scattering switching element 5. The louver 8 is configured so that the boundaries between the transmissive areas 8a and the absorptive areas 8b (transmission/absorption boundaries) are orthogonal to the surface of the louver 8, in the same manner as in the louver 8 in the third modified example of the second embodiment described above. In other words, the absorptive areas stand erect with respect to the louver 8. In contrast to the third modified example of the second embodiment described above, however, the louver 8 is not curved but is flat. Also, the machined surface of the lens of the Fresnel lens sheet 3 faces in the +Z direction, and the non-machined surface faces the −Z direction and is in close contact with the louver 8. Features other than those described above in connection with this embodiment are the same as those of the second embodiment described above.

The operation of the display apparatus of the present embodiment is described next. The component in the direction perpendicular to the light-emitting surface of the luminous flux L emitted from the planar light source 2 is the most intense, as shown in FIG. 22A. In other words, the component of the luminous flux L in the +Z direction is the principal-direction component L1. When the luminous flux L enters the louver 8, the traveling direction of the luminous flux L is restricted to a direction within a fixed range of angles about the +Z direction, as shown in FIG. 22B, because the transmission/absorption boundaries of the louver 8 are parallel to the Z-axis direction. Only the components whose direction falls within a fixed range of angles about the +Z direction, i.e., only the principal-direction component L1, is emitted from the louver 8.

When the luminous flux L enters the Fresnel lens sheet 3, the flux L is deflected at each of the positions of the Fresnel lens sheet 3, and the traveling direction of the luminous flux is changed. In other words, the luminous flux L is deflected toward the center area in the X-axis direction at the two ends of the X-axis direction of the Fresnel lens sheet, and the luminous flux L is not deflected and passes through the Fresnel lens sheet 3 unchanged in the center area in the X-axis direction of the Fresnel lens sheet 3, as shown in FIG. 22C. As a result, the luminous flux L is focused in one dimension in the X-axis direction by being passed through the Fresnel lens sheet 3. The luminous flux thereafter enters the transparent/scattering switching element 5. The operation other than that described above in this embodiment is the same as in the second embodiment described above.

In the present embodiment, the principal-direction component L1 of the luminous flux L can pass through the louver 8 since there is a match between the principal traveling direction (+Z direction) of the luminous flux L emitted from the planar light source 2 and the direction (+Z direction) in which light rays are restricted by the louver 8. Therefore, the loss of light is low from the louver 8, and, in particular, the brightness in the end portions of the light-emitting surface is not reduced. The Fresnel lens sheet 3 focuses the high-directivity luminous flux that has passed through the louver 8, and the luminous flux can therefore be focused in the front-surface position.

In the present embodiment, an ordinary louver in which the directions of the transmission/absorption boundaries are aligned can be used, and, in particular, a louver in which the transmission/absorption boundaries stand erect can be used. Since such a louver can be procured as a commercial product, the manufacture of a light source apparatus can be simplified and the cost reduced in the present embodiment. The effects other than those described above in this embodiment are the same as those of the second embodiment described above.

Figure 23:
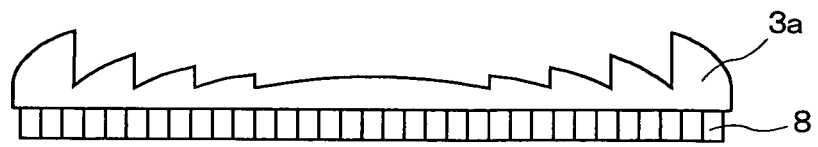
FIG. 23 is a side view showing the positional relationship between the louver and the Fresnel lens sheet in the first modified example of the third embodiment.

The first modified example of the third embodiment is described next. FIG. 23 is a side view showing the positional relationship between the louver and the Fresnel lens sheet in the modified example. In the present embodiment, a Fresnel lens sheet 3a having a modulated groove depth is provided, as shown in FIG. 23. In accordance with the modified example, the Fresnel lens sheet 3a and the transparent/scattering switching element 5 (see FIG. 20) disposed above the sheet come close together over a small area, and a sufficient amount of space is assured between the sheet and the element. Newton rings and other interference fringes that occur in the Fresnel lens sheet and transparent/scattering switching element can be reduced, and a higher image quality can be obtained. Features other than those described above in connection with this modified example are the same as those of the third embodiment described above.

Figure 24:
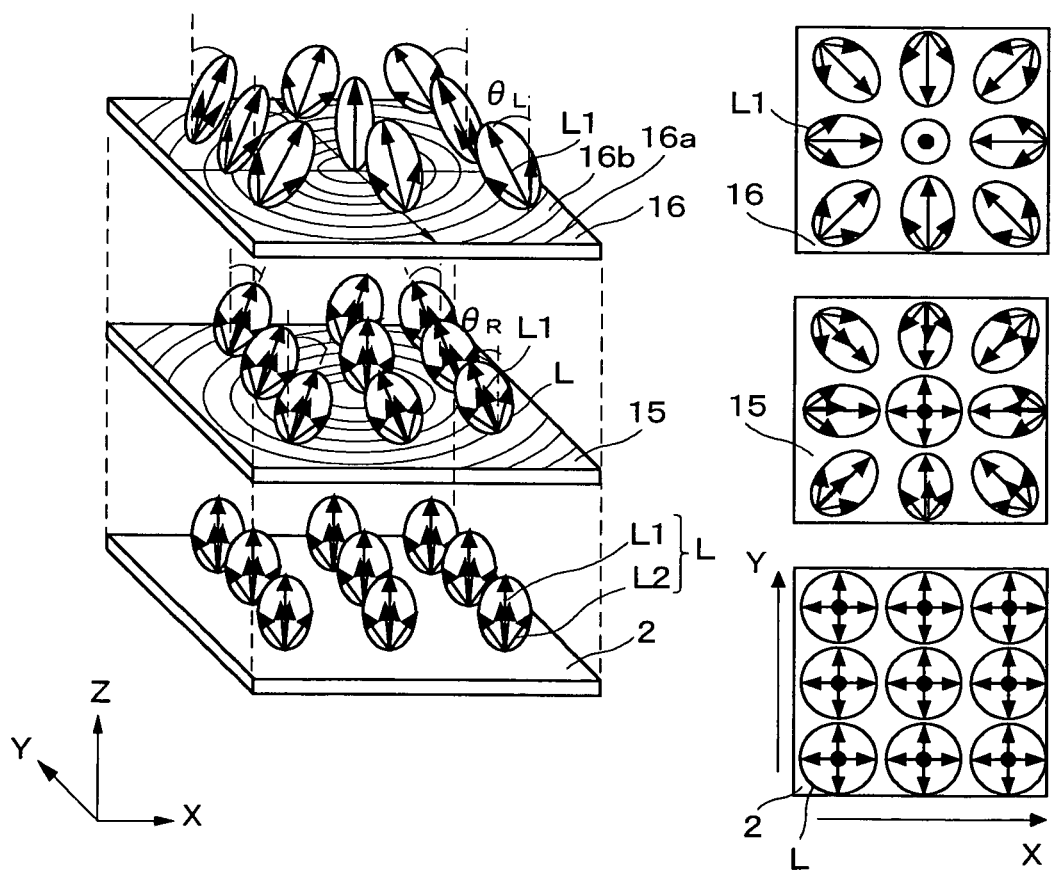
FIG. 24 is a perspective view and a plan view that schematically show the operation of the display apparatus according to the fourth embodiment of the present invention.

The fourth embodiment of the present invention is described next. FIG. 24 is a perspective view and a plan view that schematically show the operation of the display apparatus of the present embodiment. In the present embodiment, a Fresnel lens sheet 15 for focusing light in two dimensions is disposed on the planar light source 2 in the light source apparatus, and a louver 16 for restricting the traveling direction of light in two dimensions is disposed on the Fresnel lens sheet 15, as shown in FIG. 24. The Fresnel lens sheet 15 is a sheet whose surface has been machined into a concentric circular lens shape. The sheet focuses light toward an imaginary point (focal point) outside the display apparatus. The optical axis of the Fresnel lens sheet 15 passes through the center of the Fresnel lens sheet 15 and is a straight line that extends in the Z-axis direction. In the louver 16, transmissive areas 16a and absorptive areas 16b are alternately disposed in a concentric circular fashion. The direction of the transmission/absorption boundaries of the louver 16 varies depending on the position of the louver 16, the transmission/absorption boundaries are parallel to the Z-axis direction in the center of the louver 16, and the transmission/absorption boundaries are progressively more sloped in relation to the Z-axis direction as the distance from the center increases in the same manner as the second embodiment described above. Features other than those described above in connection with this embodiment are the same as those of the second embodiment described above.

The operation of the apparatus of the present embodiment is described next. In the present embodiment, light that has entered from the planar-light source 2 is deflected by the Fresnel lens sheet 15 toward the optical path of the Fresnel lens sheet 15, as shown in FIG. 24. At this point, the amount of deflection increases with an increase in the distance from the center of the Fresnel lens sheet 15. As a result, light that enters from the planar light source 2 is focused by the Fresnel lens sheet 15 in concentric circles centered on the optical path of the Fresnel lens sheet 15. In other words, light that has entered the Fresnel lens sheet 15 is focused in the XY plane in two dimensions toward the focal point of the Fresnel lens sheet 15. The light then enters the louver 16.

When the louver 16 is viewed on a microscopic scale, the transmissive and absorptive areas are arrayed in one direction. In other words, the transmissive and absorptive areas are arrayed in the radial direction of concentric circles formed thereby. For this reason, light that has entered the louver 16 is restricted to a fixed range of angles about the principal direction of the light in the radial direction of the concentric circles, and the directivity is increased. In contrast, in the peripheral direction of the concentric circles, the traveling direction of the incident light is substantially unrestricted and the directivity remains low. As a result, the diagram showing the orientation characteristics of the luminous flux emitted from the louver 16 in FIG. 24 changes from an oval body prior to the entry of light in the louver 16 to a shape that resembles a collapsed rugby ball.

Since the principal-direction component L1 of the luminous flux L thereby reaches the front position of the display apparatus, i.e., the focal position of the Fresnel lens sheet 15, from the entire display screen, the entire screen appears uniformly bright when viewed by an observer positioned in front of the screen. In other words, the viewability from the front position is high. In contrast, the principal-direction component L1 of the luminous flux L does not reach positions offset in the X-axis direction and/or the Y-axis direction (diagonal positions) from the front position of the display apparatus. However, light that has passed through the louver 16 is substantially unrestricted in the peripheral directions of the concentric circles, as described above. Therefore, a portion of the lateral-direction components L2 of the luminous flux L may reach diagonal positions as well. For this reason, there is an area in which the display surface can be partially viewed by an observer positioned in a diagonal position, but the entire screen cannot be viewed, and it is mostly impossible to read the displayed image. In other words, the viewability from a diagonal position is very poor. Unwanted viewing from diagonal positions apart from the front position can thereby be prevented.

Thus, in accordance with the present embodiment, high-directivity display can be carried out not only in the horizontal direction of the display screen but also in the vertical direction when the narrow-viewing-angle display is used. As a result, unwanted viewing can be prevented not only from positions offset from the front position in the horizontal direction, but also from positions offset in the vertical and diagonal directions. The operation and effects in this embodiment are the same as those of the second embodiment described above.

Figure 25:
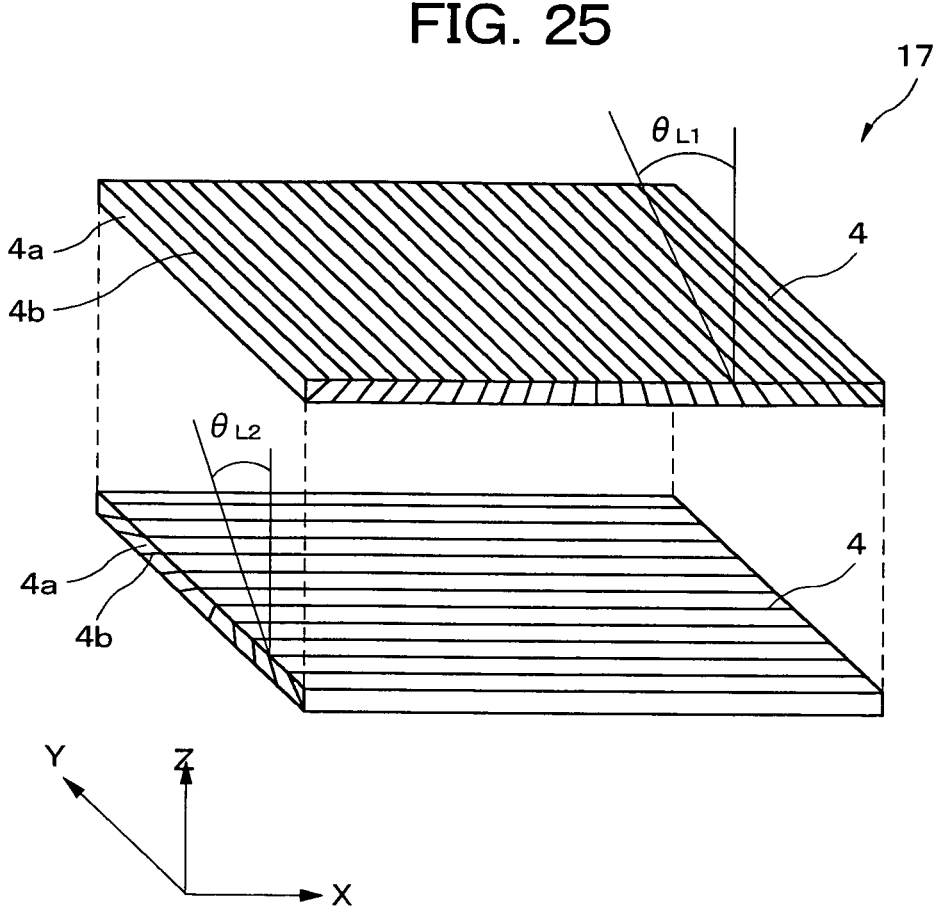
FIG. 25 is a perspective view showing the louver in the first modified example of the fourth embodiment.

The first modified example of the fourth embodiment is described next. FIG. 25 is a perspective view showing the louver in the modified example. In this modified example, a louver 17 is provided in place of the louver 16 (see FIG. 24) used in the fourth embodiment described above, as shown in FIG. 25. The louver 17 is composed of two stacked louvers 4, one of which is shown in the second embodiment described above. The two louvers 4 are stacked so that the array directions of the transmissive areas and absorptive areas are mutually orthogonal. For example, the louver 4 facing the lower layer has an array direction that is set in the Y-axis direction, and the louver 4 facing the upper layer has an array direction that is set in the X-axis direction. In the present modified example, unwanted viewing from positions offset in the horizontal direction from the front position, and unwanted viewing from positions offset in the vertical direction, can be prevented at the same time. The configuration, operation, and effects other than those described above in this modified example are the same as those of the fourth embodiment described above.

Figure 26:
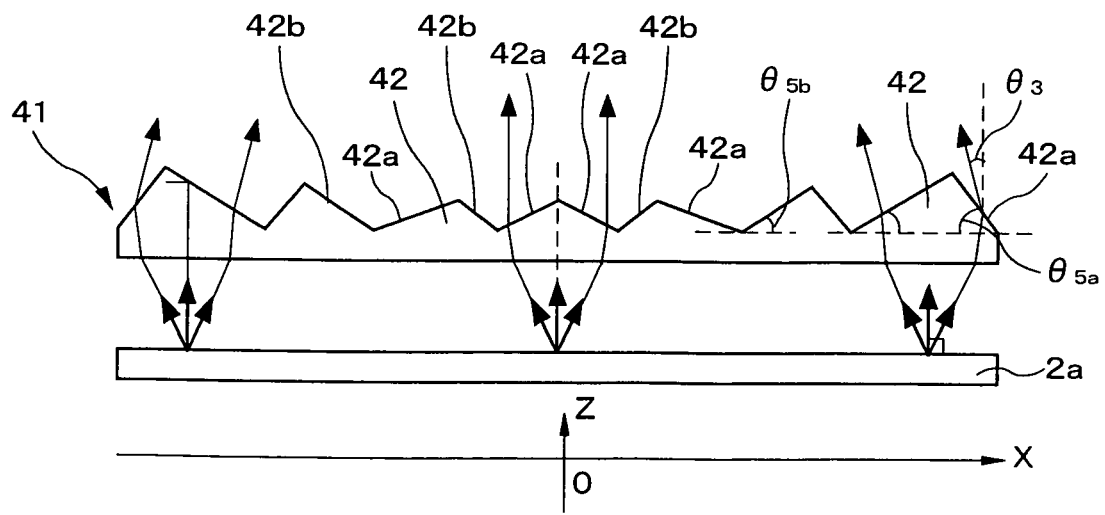
FIG. 26 is a side view showing the prism sheet in the display apparatus according to the fifth embodiment of the present invention, in which the machined surface of the prism is facing the planar light source side, and the non-machined surface is facing the planar light source side.

The fifth embodiment of the present invention is described next. FIG. 26 is a side view showing the prism sheet in the display apparatus of the present embodiment. The case is illustrated in which the non-machined surface of the prism faces the planar light source. In the display apparatus of the present embodiment, a prism sheet 41 is provided as a deflecting element, as shown in FIG. 26. In other words, the prism sheet 41 is provided in place of the Fresnel lens sheet 3 used in the display apparatus of the above-described second embodiment (see FIG. 8). A plurality of prisms 42 are formed on one side of the prism sheet 41. The prisms 42 are triangular columns, and the ridge lines of the columns extend in the Y-axis direction. The plurality of prisms 42 are arrayed along the X-axis direction. The surface on the opposite side from the surface on which the prisms 42 are formed on the prism sheet 41 is a non-machined surface (flat surface), and the non-machined surface faces the planar light source. The shape of the prism sheet 41 is planarly symmetrical in relation to the YZ plane (X=0). Also, in the present embodiment, a diffusive planar light source 2a is provided in place of the planar light source 2 for emitting light with high directivity (see FIG. 8). Features other than those described above in connection with the present embodiment are the same as those of the second embodiment described above.

The prism sheet 41 shown in FIG. 26 is a refractive prism sheet. The excident angle $\theta_3$ is the angle formed by the Z-axis direction and the direction of the light emitted from the prism sheet 41, the prism slope angle $\theta_{5a}$ is the angle formed by the XY plane and the side surfaces 42a of the far side in the prisms 42, and the prism slope angle $\theta_{5b}$ is the angle formed by the XY plane and the side surface 42b of the near side, as viewed from the center of the prism sheet 41. Therefore, the prism slope angle $\theta_{5a}$ is large at the two ends in the X-axis direction and grows smaller as the distance to the center area decreases. The prism slope angle $\theta_{5b}$ is small at the two ends in the X-axis direction and grows larger as the distance to the center area increases. The prism slope angles $\theta_{5a}$ and $\theta_{5b}$ are, for example, 45 degrees in the prisms 42 positioned in the center area of the X-axis direction (X=0). In contrast, the slope angle $\theta_{5a}$ is 54 degrees, and the slope angle $\theta_{5b}$ is 31 degrees in the prisms 42 positioned at the two ends of the X-axis direction. The bisector of the apexes of the prisms 42 faces the center area of the X-axis direction.

Described next is the operation of the display apparatus of the present embodiment configured in the manner described above. The diffusive planar light source 2a emits light that uniformly and isotropically spreads within the excident plane of the light source. The light then enters the non-machined surface of the prism sheet 41.

Described first is the operation of the prisms 42 in the center area of the X-axis direction, i.e., the position at which X=0. Light emitted from the diffusive planar light source 2a in the +Z direction arrives at the non-machined surface of the prism sheet 41 and thereafter enters the prisms 42 without changing its direction of travel. Since the prism slope angle $\theta_{5a}$ of the side surfaces 42a of the prisms 42 in the center area of the X-axis direction is 45 degrees and is greater than the critical angle of 41.8 degrees, the light that has arrived at the side surfaces 42a undergoes total reflection and returns to the diffusive planar light source 2a.

Conversely, light emitted by the diffusive planar light source 2a in the diagonal direction; e.g., light that is emitted in the direction inclined 26 degrees to the +X direction with respect to the +Z direction is reflected upon entering the prism, travels in the direction 17 degrees with respect to the +Z direction, and arrives at the side surfaces 42a of the prisms 42. Since the side surfaces 42a are sloped 45 degrees with respect to the +Z direction, the light enters the prisms 42 the side surfaces 42a at an angle of 28 degrees with respect to the normal direction of the side surfaces 42a. In this case, the incident angle is less than the critical angle of 41.8 degrees, and the light is emitted in the direction inclined 45 degrees with respect to the normal direction of the side surfaces 42a, i.e., the +Z direction. In this manner, light with high directivity in the front surface direction is emitted from the prisms 42 positioned in the center area of the X-axis direction (X=0).

Described next is the operation of the prisms 42 positioned in the end portion toward the +X direction in the prism sheet 41 (i.e., the end portion on the right side of the diagram in FIG. 26). Light emitted by the diffusive planar light source 2a and inclined with respect to the +X direction; e.g., light that is emitted in the direction inclined 26 degrees toward the +X direction with respect to the +Z direction, is refracted upon entering the prisms 42, and is caused to travel in the direction inclined 17 degrees toward the +X direction side with respect to the +Z direction. Upon arrival at the side surfaces 42a of the prisms 42, the light enters the side surfaces 42a at an angle of 37 degrees with respect to the normal direction of the side surfaces 42a, because the side surfaces 42a are sloped 36 degrees with respect to the +Z direction. At this point, since the incident angle with respect to the side surfaces 42a is less than the critical angle of 41.8 degrees, the light is emitted in the direction inclined 64 degrees with respect to the normal direction of the side surfaces 42a, i.e., the direction inclined 10 degrees toward the −X direction with respect to the +Z direction, and is emitted toward the center in the X-axis direction. The light that has entered the side surfaces 42a at an angle that is equal to or greater than the critical angle 41.8 degrees undergoes total reflection at the side surfaces 42a and either returns to the diffusive planar light source 2a or scatters to become stray light.

Light emitted from the diffusive planar light source 2a and inclined toward the −X direction; e.g., light that is emitted in the direction inclined 26 degrees toward the −X direction with respect to the +Z direction, is refracted upon entering the prisms 42, and is caused to travel in the direction inclined 17 degrees toward the −X direction with respect to the +Z direction. Upon arrival at the side surfaces 42b of the prisms 42, the light enters the side surfaces 42b at an angle of 13 degrees with respect to the normal direction of the side surfaces 42b because the side surfaces 42b are sloped 70 degrees with respect to the +Z direction. At this point, since the incident angle with respect to the side surfaces 42b is less than the critical angle of 41.8 degrees, the light is emitted in the direction inclined 20 degrees with respect to the normal direction of the side surfaces 42b, i.e., the direction inclined 10 degrees in the −X direction with respect to the +Z direction, and is emitted toward the center in the X-axis direction. The light that has entered the side surfaces 42b at an angle that is equal to or greater than the critical angle 41.8 degrees undergoes total reflection at the side surfaces 42b and either returns to the diffusive planar light source 2a or scatters to become stray light.

The operation of the prisms 42 positioned in the end portion toward the −X direction in the prism sheet 41 is symmetrical in relation to the YZ plane to the operation of the prism 42 positioned in the end portion toward the +X direction described above. High-directivity light is thus emitted in a direction inclined 10 degrees away from the +Z direction toward the center area in the X-axis direction in the prisms 42 positioned at the two ends of the prism sheet 41. The light arrives at the front position of the display apparatus. Since the inclination angle of the sloped surface varies depending on the X coordinate of the prism in prisms positioned between the two end portions and the center area of the prism sheet 41 in the X-axis direction, the high-directivity light emitted by the prisms is propagates toward the front position. In this manner, the light emitted from the prism sheet 41 is focused toward the front position. The operation other than that described above in the present embodiment is the same as that of the second embodiment described above.

In the present embodiment, light emitted from the prism sheet can be focused at the front position when a diffusive planar light source is used. The components of a diffusive planar light source generally have a diffusion function. Therefore, nonuniformities in brightness in the plane can be reduced and uniformity improved through the use of this diffusion function. The effects other than those described above in the present embodiment are the same as those of the second embodiment described above.

Figure 27:
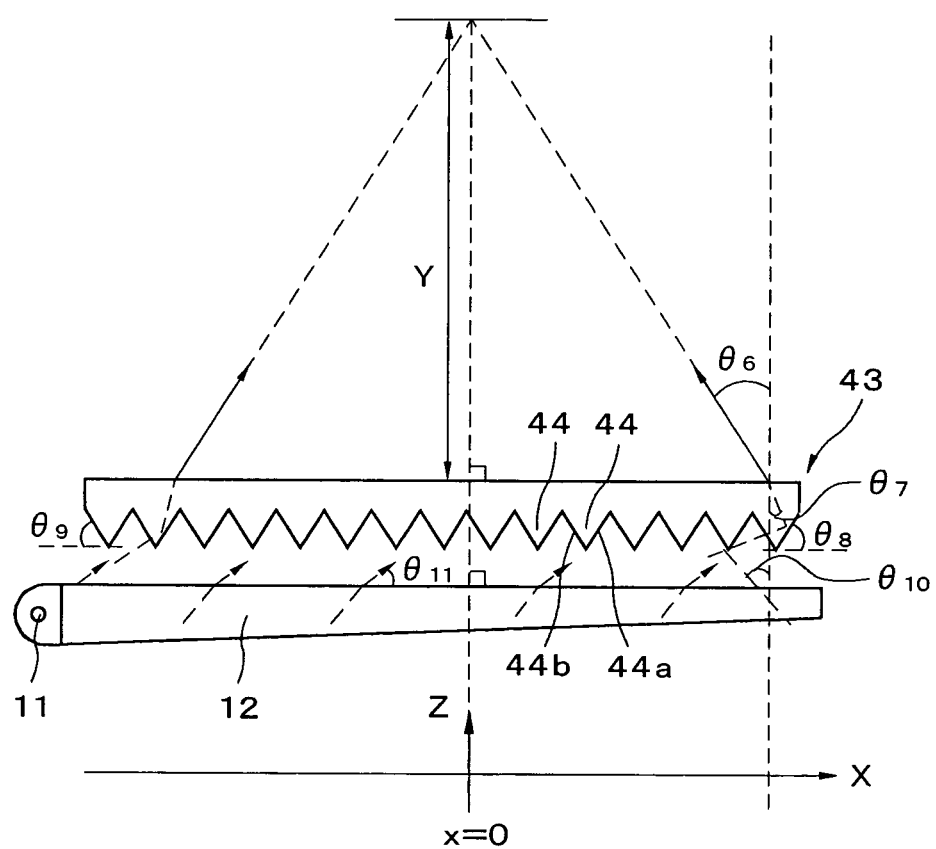
FIG. 27 is a side view showing the operation of the sixth embodiment.
Figure 28:
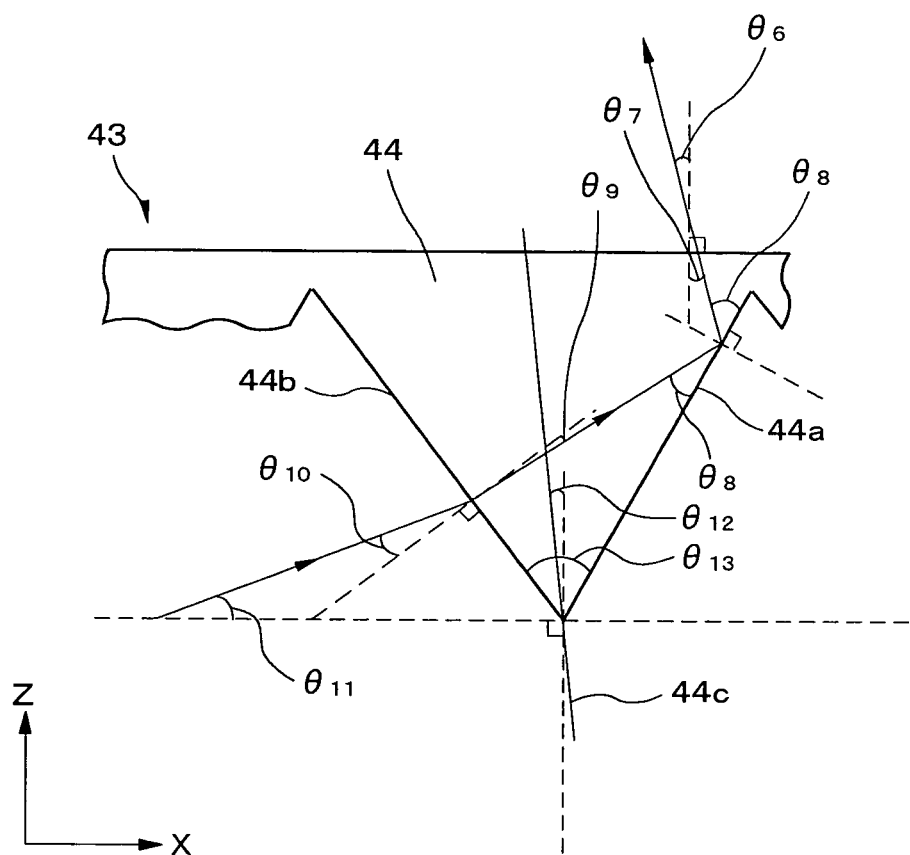
FIG. 28 is an enlarged side view showing the operation of the prisms of the Fresnel lens sheet.
Figure 29:
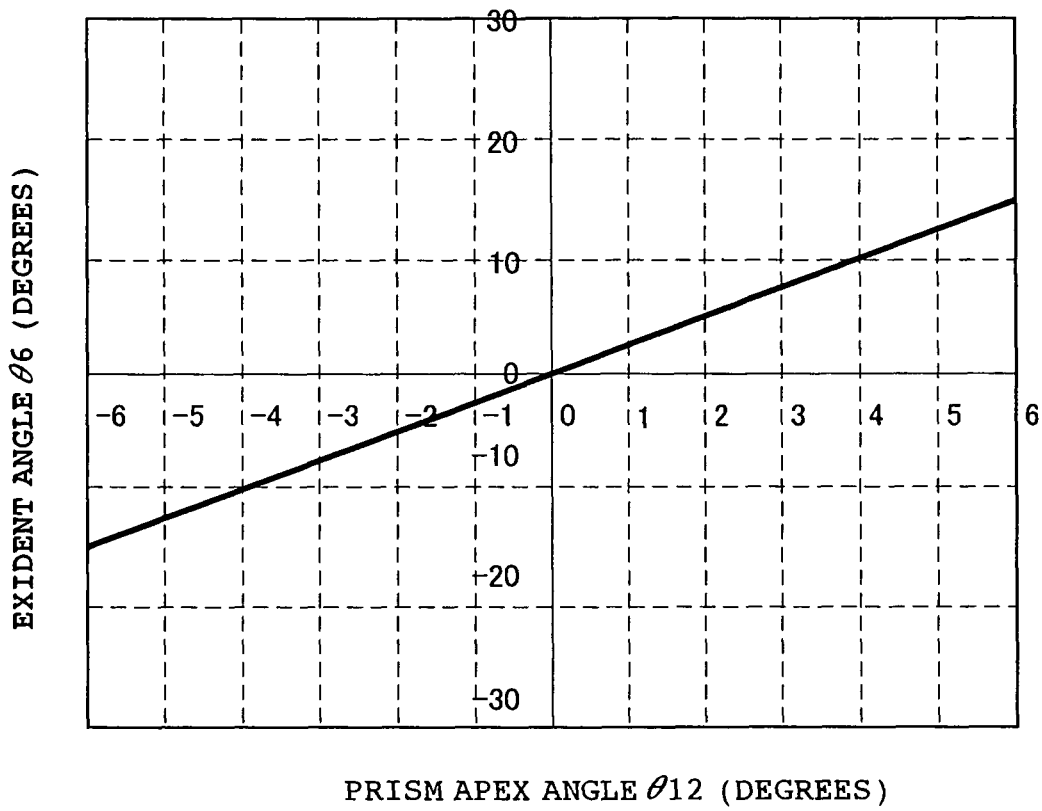
FIG. 29 is a graph showing the relationship between two angles, i.e., the angle $\theta_{12}$ formed by the +Z direction and the bisector of the prism vertex shown in the FIG. 28, plotted on the horizontal axis, and the excident angle $\theta_6$ of light emitted from the non-machined surface of the prism sheet, plotted on the vertical axis.

The sixth embodiment of the present invention is described next. FIG. 27 is a side view showing the operation of the present embodiment. FIG. 28 is an enlarged side view showing the operation of the prisms of the Fresnel lens sheet. FIG. 29 is a graph showing the relationship between two angles, i.e., the angle $\theta_{12}$ formed by the +Z direction and the bisector of the prism vertex shown in the FIG. 28, plotted on the horizontal axis, and the excident angle $\theta_6$ of light emitted from the non-machined surface of the prism sheet, plotted on the vertical axis.

In the present embodiment, a total-reflection prism sheet 43 is provided in place of the prism sheet 41 (see FIG. 26) used in the fifth embodiment described above, as shown in FIG. 27. A plurality of triangular columnar prisms 44 extending in the Y-axis direction are formed on the surface of the prism sheet 43 facing in the −Z direction, and the prisms are arrayed along the X-axis direction. The prism sheet 43 doubles as the prism sheet 13 (see FIG. 8) included in the planar light source 2. A planar light source composed of a light source 11 and a light-guide plate 12 is provided in place of the planar light source 2a used in the fifth embodiment described above. The light-guide plate 12 has a flat lower surface; i.e., the surface on the side facing the reflective sheet is a flat surface inclined 4 degrees in the +Z direction with respect to the +X direction. Features other than those described above in connection with the present embodiment are the same as those of the fifth embodiment described above.

As shown in FIGS. 27 and 28, the backlight excident angle $\theta_{11}$ is the angle formed by the +X direction and the principal direction of the light emitted from the light-guide plate 12; the prism incident angle $\theta_{10}$ is formed by the normal line to the side surface 44b and the traveling direction of light that is emitted from the light-guide plate 12 and directed to the side surfaces 44b of in the prisms 44 facing in the −X direction; the refractive angle $\theta_9$ is formed by the normal line to the side surfaces 44b and the direction in which the light travels after entering the prisms 44 from the side surfaces 44b, the reflected angle $\theta_8$ is formed by the side surfaces 44a and the traveling direction of light when the light travels through the prisms 44 and is reflected at the side surfaces 44a of the prisms 44 facing in the +X direction; the transmissive angle $\theta_7$ is formed by the +Z direction and the traveling direction of light reflected at the side surfaces 44a; the prism excident angle $\theta_6$ is the angle formed by the +Z direction and the direction of light emitted by the prism sheet 43, $\theta_{13}$ is the vertex of the prisms 44, and the prism slope angle $\theta_{12}$ is the angle formed by the +Z direction and the bisector 44c of the prism vertex.

The bisector 44c of the prism vertex is sloped toward the two ends of the X-axis direction with respect to the −Z direction. In other words, the vertices of the prisms 44 positioned on the side facing the +X direction as viewed from the center area of the X-axis direction (position where X=0) are directed toward the +X direction away from the −Z direction, and the vertices of the prisms 44 positioned on the side facing the −X direction are directed toward the −X direction.

The prism slope angle $\theta_{12}$ continuously varies from the prisms 44 positioned in the end portion on side facing the −X direction to the prisms 44 position in the end portion on the side facing the +X direction. The prism slope angle $\theta_{12}$ of the bisector 44c of the prisms positioned at both ends may, for example, be 4 degrees, and the prism slope angle $\theta_{12}$ of the prisms positioned in the center area of the X-axis direction is 0 degrees. In other words, the bisector 44c of the prisms positioned in the center area of the X-axis direction is directed in the Z-axis direction. The prism vertex $\theta_{13}$ is 65.7 degrees, and the refractive index of the prisms 44 is 1.5, for example.

Described next is the operation of the light source apparatus of the present embodiment configured in the manner described above. Light emitted by the light source 11 enters the light-guide plate 12 and arrives at the light-emitting surface (upper surface) of the light-guide plate 12 on the side facing the prism sheet, and if the angle formed by the traveling direction of the light with respect to the +Z direction is greater than the critical angle 41.8 degrees, the light undergoes total reflection and remains in the light-guide plate 12, as shown in FIGS. 27 and 28. For example, light whose traveling direction forms an angle of 46.8 degrees with the +Z direction undergoes total reflection at the light-emitting surface and arrives at the surface (lower surface) of the light-guide plate 12 facing in the −Z direction. Since the lower surface is sloped 4 degrees toward the +Z direction side with respect to the +X direction, the light that has arrived at the lower surface undergoes total reflection in the direction inclined 43 degrees from the normal line to the lower surface, and reaches the light-emitting surface of the light-guide plate 12. At this point, the traveling direction of the light is inclined 39 degrees with respect to the +Z direction, which is the normal line to the light-emitting surface, and the incident angle is less than the critical angle of 41.8 degrees. The light is therefore emitted to the exterior of the light-guide plate 12. In this case, the light is emitted in the direction inclined toward the +X direction side with respect to +Z direction, and the excident angle (backlight excident angle $\theta_{11}$) of the light is 20 degrees.

Thus, among the light propagated through the light-guide plate 12, light whose angle of incidence on the light-emitting surface is greater than the critical angle propagates so that the angle of the traveling direction of this light with respect to +Z direction approaches the critical angle each time the light undergoes total reflection at the lower surface while propagating through the light-guide plate 12. The lower surface is inclined 4 degrees with respect to +X direction. At the point at which the angle has become less than the critical angle, the light exits from the light-emitting surface. As a result, the light emitted from the light-guide plate 12 has high directivity in the direction inclined 70 degrees away from the +Z direction in the ZX plane.

The light emitted from the light-guide plate 12 at an inclination angle of 70 degrees thus enters the side surfaces 44b of the prisms 44 of the prism sheet 43 at the prism incident angle $\theta_{10}$. At this point, the incident light is refracted in accordance with the refractive index of the material of the prism sheet 43, and travels through the prisms 44 in the direction that forms a prescribed refraction angle $\theta_9$ with respect to the side surfaces 44b. The light is reflected by the side surfaces 44a and emitted through the non-machined surface of the prism sheet 43 to the exterior of the prism sheet 43.

The operation of the prisms 44 is described below with reference to specific numerical examples. Described first is the operation of the prisms 44 disposed in the center area of the prism sheet 43 in the X-axis direction (X=0). As described above, the vertex angle $\theta_{13}$ of the prisms 44 is 65.7 degrees, the refractive index of the material of the prisms 44 is 1.5, and the backlight excident angle $\theta_{11}$ is 20 degrees. The prisms disposed in the center area of the X-axis direction have a prism slope angle $\theta_{12}$ of 0 degrees.

For this reason, the prisms 44 positioned in the center area of the X-axis direction have a prism incidence angle $\theta_{10}$ of 12.9 degrees, a refraction angle $\theta_9$ of 8.5 degrees, and a reflection angle $\theta_8$ of 32.8 degrees on the side surfaces 44a, producing total reflection. As a result, the prism excident angle $\theta_6$ is 0 degrees, and the light is perpendicularly emitted from the non-machined surface (surface facing the +Z direction). In this manner, light that has entered the prism at the position X=0 is emitted with high directivity in the front surface direction.

The prisms 44 positioned in the end portion of the prism sheet 43 facing in the +X direction have a prism slope angle $\theta_{12}$ of 4 degrees. The prism excident angle $\theta_6$ is therefore 10 degrees. In other words, light emitted from the prism sheet 43 travels and arrives at the observer in the direction inclined 10 degrees away from the +Z direction toward the −X direction.

FIG. 29 shows the relationship between the prism slope angle $\theta_{12}$ and the prism excident angle $\theta_6$ in a case in which the prism vertex angle $\theta_{13}$ is fixed at 65.7 degrees. In FIG. 29, a positive value is assigned to the prism slope angle $\theta_{12}$ when the vertices of the prisms are directed toward the +X direction, i.e., of when the bisector 44c of the prism vertices is sloped toward the +X direction with respect to the −Z direction; and a positive value is assigned to the prism excident angle $\theta_6$ is positive when the traveling direction of the light emitted from the prism sheet 43 is sloped toward the −X direction with respect to the +Z direction.

In prisms disposed facing the −X direction in the prism sheet 43, the prism slope angle $\theta_{12}$ takes on a negative value, and prism excident angle $\theta_6$ therefore also takes on a negative value, as shown in FIG. 29. The traveling direction of the light emitted from the prism sheet 43 is inclined toward the +X direction with respect to the +Z direction. Conversely, in a prism disposed facing the +X direction, the prism slope angle $\theta_{12}$ takes on a positive value, the prism excident angle $\theta_6$ also takes on a positive value, and the traveling direction of the light emitted from the prism sheet 43 is inclined toward the −X direction with respect to the +Z direction. Also, since the absolute value of the prism slope angle $\theta_{12}$ increases with a reduction in the distance of a prism from the two ends of the X-axis direction, the absolute value of the prism excident angle $\theta_6$ also increases with a reduction in the distance of a prism from the two ends in the X-axis direction, as shown in FIG. 29. As a result, light emitted from the prism sheet 43 is focused in the front position of the display apparatus.

In the present embodiment, a total-reflection prism sheet that faces downward and has high directivity is used as the deflecting element, and the efficiency with which light passes through the louver is therefore improved. The operation and effects other than those described above in the present embodiment are the same as those of the fifth embodiment described above.

Figure 30A:
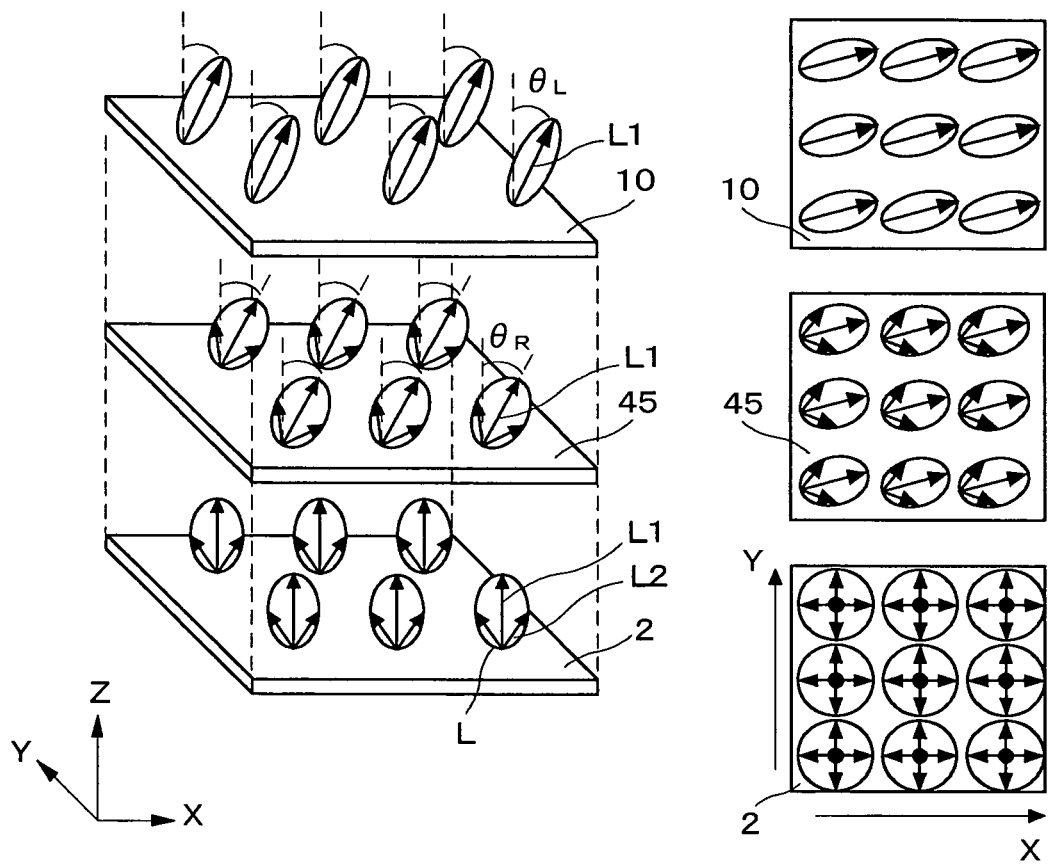
FIG. 30A is a perspective view and a plan view that schematically show the operation of the display apparatus of the seventh embodiment.
Figure 30B:
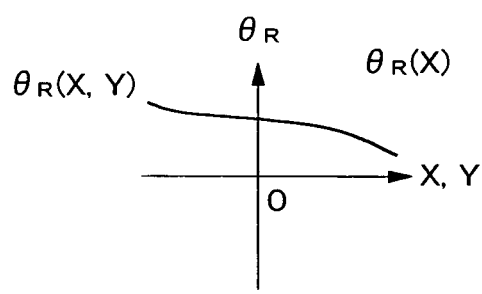
FIG. 30B is a graph showing the deflection characteristics of a prism sheet, wherein the position in the luminous flux emitted from the prism sheet is plotted on the horizontal axis, and the angle at which brightness is at its maximum is plotted on the vertical axis.
Figure 30C:
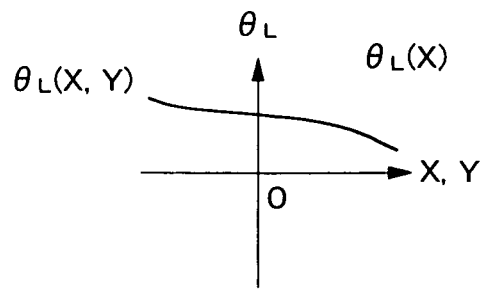
FIG. 30C is a graph showing the characteristics according to which the direction of light rays is restricted by a louver, wherein the position in the luminous flux emitted from the louver is plotted on the horizontal axis, and the angle at which brightness is at its maximum is plotted on the vertical axis.

The seventh embodiment of the present invention is described next. FIG. 30A is a perspective view and a plan view that schematically show the operation of the display apparatus of the present embodiment. FIG. 30B is a graph showing the deflection characteristics of a prism sheet, wherein the position in the luminous flux emitted from the prism sheet is plotted on the horizontal axis, and the angle at which brightness is at its maximum is plotted on the vertical axis. FIG. 30C is a graph showing the characteristics according to which the direction of light rays is restricted by a louver, wherein the position in the luminous flux emitted from the louver is plotted on the horizontal axis, and the angle at which brightness is at its maximum is plotted on the vertical axis.

In the present embodiment, a prism sheet 45 and a louver 10 are disposed in the stated order on the planar light source 2, as shown in FIG. 30A. The prism sheet 45 causes the luminous flux that enters from the +Z direction to be inclined overall away from the +Z direction toward the +X direction, and focuses the light, as shown in FIGS. 30A and 30B. The louver 10 restricts the luminous flux L emitted from the prism sheet 45 to the principal direction of the luminous flux, and allows only the principal-direction component L1 of the luminous flux L to pass through, as shown in FIG. 30C. The light emitted from the planar light source 2 is thereby deflected by the prism sheet 45 toward the +X direction. The directivity of the light is increased by the louver 10, and the light is emitted. Thus, in the present embodiment, the direction of the light rays across the entire screen can be deflected in a different direction than the front surface direction. The configuration and operation other than those described above in connection with the present embodiment are the same as in the fifth embodiment described above.

The display apparatus of the present embodiment can be mounted in an onboard television receiver, for example. If the onboard television receiver is installed between the driver's seat and the passenger's seat, and the +X direction described above is set to be on side of the passenger's seat, it is possible to provide an arrangement in which the image can be viewed from the passenger's seat but not the driver's seat when the narrow-viewing-angle display is used. This prevents the driver from viewing the image while driving, and increases driving safety. Also, if the wide-viewing-angle display is used, the image can be view both from the passenger's seat and from the driver's seat.

Figure 31:
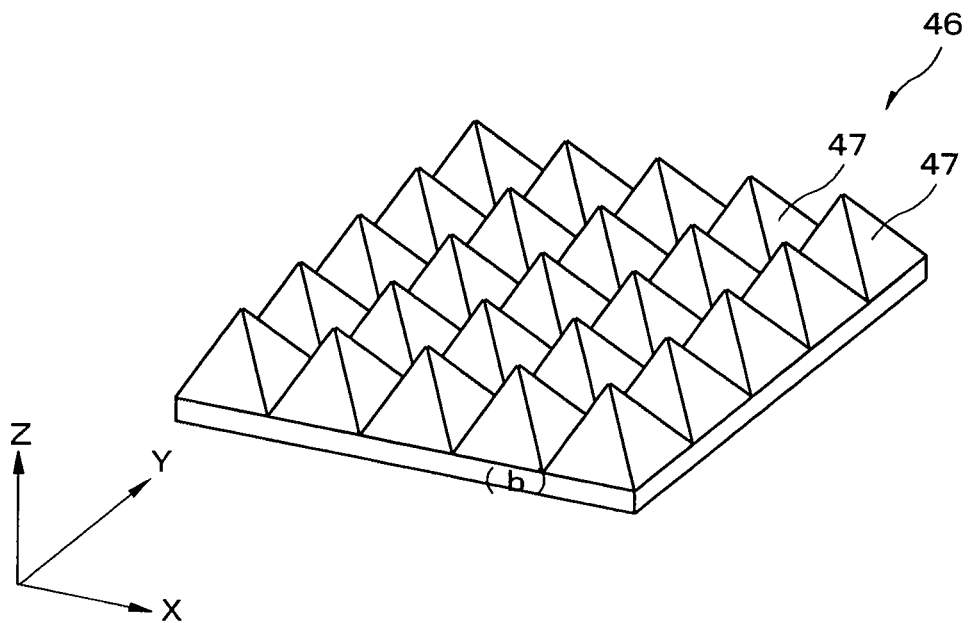
FIG. 31 is a perspective view showing a prism sheet in the display apparatus according to the eighth embodiment of the present invention.

The eighth embodiment of the present invention is described next. FIG. 31 is a perspective view showing a prism sheet in the display apparatus of the present embodiment. In the display apparatus of the present embodiment, a prism sheet 46 is provided as a deflecting element, as shown in FIG. 31. A plurality of trigonal pyramid-shaped prisms 47 are arrayed in the form of a matrix along the X-axis direction and Y-axis direction on one side of the prism sheet 46. The machined surfaces of prisms of the prism sheet 46 face in the +Z direction, i.e., the louver side. The side surfaces of the prisms 47 have the same slope distribution as the side surfaces of the prisms 42 (see FIG. 26) used in the fifth embodiment described above in the cross section produced by the ZX and YZ planes. Also, a diffusive planar light source 2a is provided as a light source in the same manner as in the fifth embodiment described above. The diffusive planar light source 2a emits light that has a uniform and isotropic distribution within the excident plane of the light source. The light enters the non-machined surface of the prism sheet 41. The light that has entered the non-machined surface is focused in two dimensions by the side surfaces of the prisms in the X- and Y-axis directions, which have the same slope distribution as described above The operation of the prisms 47 is the same as that in the fifth embodiment described above.

In the present embodiment, the array direction of the prisms 47 may be different than the array direction of the transmissive areas and absorptive areas of the louver. The moiré phenomenon that occurs between the prism sheet and the louver can thereby be made less noticeable, and the display quality can be improved. Since a total-reflection prism sheet that faces downward and has high directivity is used as the deflecting element, the efficiency with which light passes through the louver is improved. The configuration, operation, and effects other than those described above in connection with the present embodiment are the same as those of the fourth embodiment described above.

Figure 32:
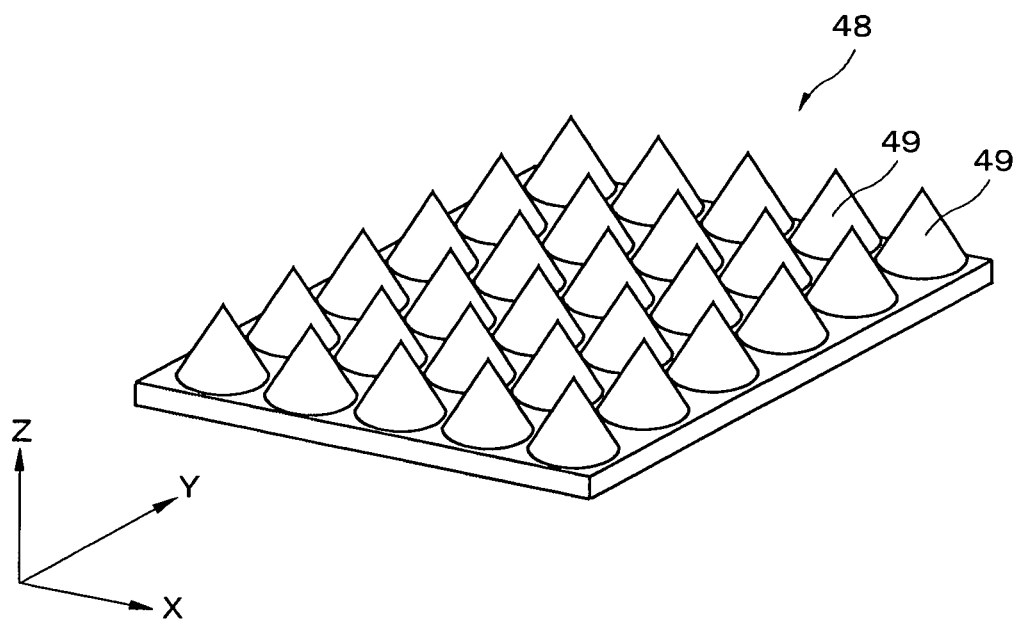
FIG. 32 is a perspective view showing a prism sheet in the first modified example of the eighth embodiment.

The first modified example of the present eighth embodiment is described next. FIG. 32 is a perspective view showing a prism sheet in the modified example. In the display apparatus of the modified example, a prism sheet 48 is provided as a deflecting element, as shown in FIG. 32. A plurality of conical prisms 49 are arrayed in the form of a matrix along the X-axis direction and Y-axis direction on one side of the prism sheet 48. The machined surfaces of the prisms on the prism sheet 48 face in the −Z direction, i.e., the planar light source 2. The planar light source in the modified example is composed of a light source 11 and light-guide plate 12 (see FIG. 27) in the same manner as in the sixth embodiment described above.

The center line of the conical prisms 49 is inclined away from the Z-axis direction, and the slope angles are distributed across the machined surface of the prism as described below. In other words, the distribution in the cross section produced by the ZX plane is the same as the slope distribution of the vertex bisector of the prism sheet used in the sixth embodiment. The distribution in the cross section produced by the YZ plane as well is the same as the slope distribution of the vertex bisector of the prism sheet used in the sixth embodiment.

Among the light emitted from the light-guide plate 12, the light that travels in the +X direction is focused on the ZX plane in the same manner as in the fifth embodiment described above. Since the light emitted from the light source 11 is dispersed within at least the XY plane, the same reasoning as in the case of the cross section produced by the ZX plane holds true for the cross section produced by the YZ plane. As a result, light emitted from the prism sheet 48 is focused in two dimensions. The light source apparatus of the present modified example has only a light-guide plate, a prism sheet, and a louver disposed in the thickness direction of the light source apparatus, i.e., the Z-axis direction, allowing the light source apparatus to be made thinner. The configuration, operation, and effects other than those described above in connection with the modified example are the same as those of the eighth embodiment described above.

In the modified example, the array direction of the conical prisms 49 is set in a direction that is different from the array direction of the transmissive and absorptive areas of the louver. The moiré phenomenon that occurs between the prism sheet and the louver can thereby be made less noticeable, and the display quality can be improved.

Figure 33:
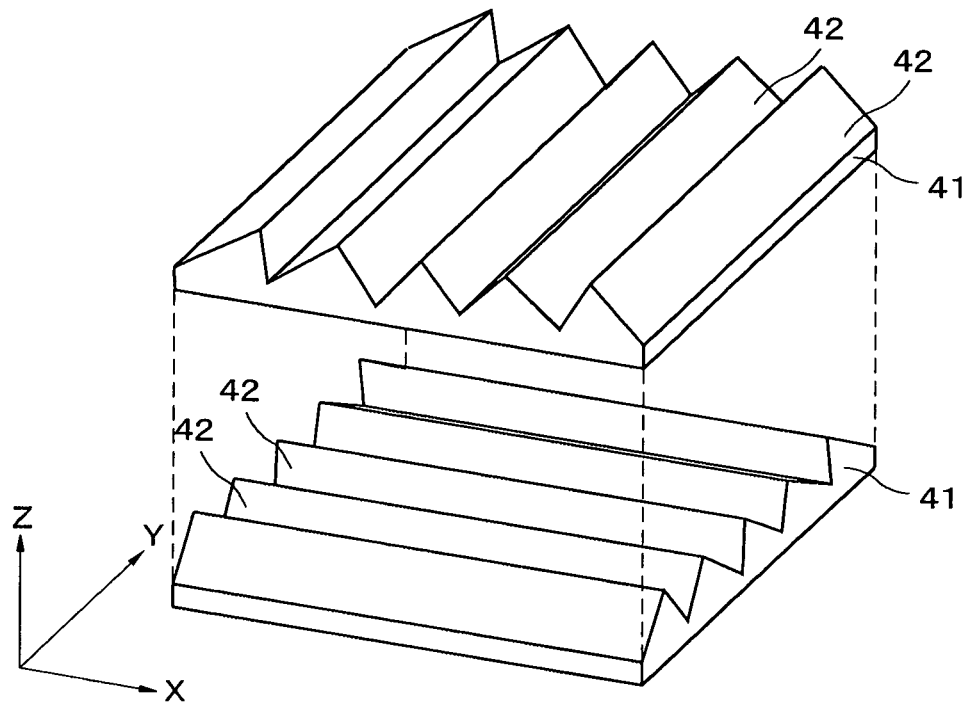
FIG. 33 is a perspective view showing a prism sheet in the second modified example of to the eighth embodiment.

The second modified example of the eighth embodiment is described next. FIG. 33 is a perspective view showing a prism sheet in the modified example. In the display apparatus of the modified example, two prism sheets 41 are provided as deflecting elements, as shown in FIG. 33. Each of the prism sheets 41 is the same as the prism sheet 41 used in the fifth embodiment described above. The prism sheet 41 facing the lower layer is disposed so that the ridge lines of the prisms 42 extend in the X-axis direction, and the prism sheet 41 facing the upper layer is disposed so that the ridge lines of the prisms 42 extend in the Y-axis direction. In the modified example, a two-dimensionally arrayed prism structure is obtained by combining two prism sheets 41 with a one-dimensional array structure. A prism sheet with a one-dimensional array structure can be manufactured more easily than a prism structure with a two-dimensional array structure, and the cost of the display apparatus can thereby be reduced. The configuration, operation, and effects other than those described above in connection with the modified example are the same as those of the eighth embodiment described above.

Figure 34:
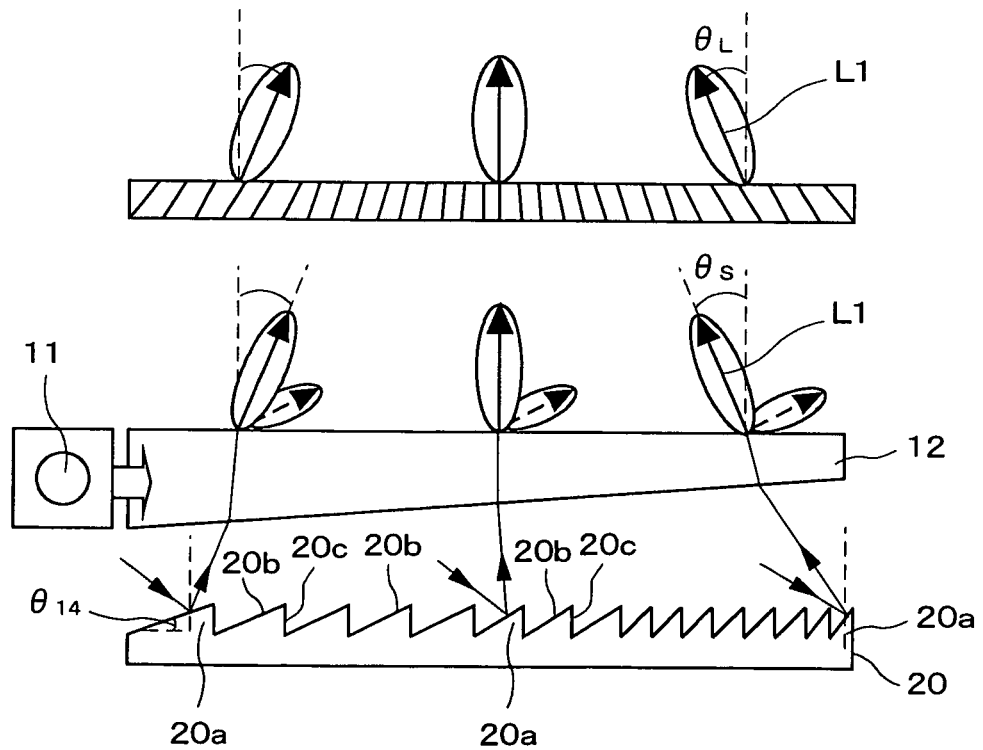
FIG. 34 is a side view schematically showing the operation of the display apparatus according to the ninth embodiment of the present invention.

The ninth embodiment of the present invention is described next. FIG. 34 is a side view schematically showing the operation of the display apparatus of the present embodiment. In the display apparatus of the present embodiment, the shapes of the reflective sheet and the planar light source are different in comparison with the second embodiment described above, as shown in FIG. 34. In other words, in the present embodiment, a reflective sheet 20 is provided in place of the reflective sheet 14 used in the second embodiment described above. A plurality of convexities 20a are disposed on the surface of the reflective sheet 20 facing in the +Z direction. The convexities 20a are formed from the same material as the reflective sheet 20 and are designed to reflect light from the surfaces thereof.

The convexities 20a are formed into the shape of triangular columns by sloped surfaces 20b that face in the −X direction and vertical surfaces 20c that face in the +X direction and are perpendicular to the X-axis direction. The ridge lines between the sloped surfaces 20b and vertical surfaces 20c extend in the Y-axis direction. A plurality of convexities 20a are arrayed in the X-axis direction, and the edges of the reflective sheet 20 in the ZX plane facing in the +Z direction are thereby formed into a serrate structure. The slope angles $\theta_{14}$ formed by the sloped surfaces 20b and the +X direction have a distribution with respect to the X-axis direction. The angles monotonically decrease with a reduction in the distance to the light source 11, and increase with an increase in the distance from the light source 11, i.e., toward the +X direction. The slope angles $\theta_{14}$ of the sloped surfaces 20b of the convexities 20a positioned the closest to the light source, i.e., in the −X direction, are equal to 30 degrees; the slope angles $\theta_{14}$ of the convexities 20a in the center area of the X-axis direction are equal to 35 degrees; and the slope angles $\theta_{14}$ of the convexities 20a the closest to the +X direction are equal to 40 degrees. Also, the lower surface (surface facing in the −Z direction) of the light-guide plate 12 may, for example, be inclined 4 degrees toward the +Z direction with respect to the +X direction. Features other than those described above in connection with this embodiment are the same as those of the second embodiment described above.

The operation of the present embodiment is described below. In the present embodiment, light that has leaked in the −Z direction from the light-guide plate 12 during propagation of light emitted from the light source 11 inside the light-guide plate 12 is reflected by the reflective sheet 20 toward the light-guide plate 12. At this point, the reflected light is focused in the X-axis direction. A portion of the light emitted from the light-guide plate 12 toward the +Z direction is thereby focused in one dimension in the X-axis direction. This operation is described in detail below.

Light rays emitted from the light source 11 to the light-guide plate 12 are propagated inside the light-guide plate 12, as shown in FIG. 34. Among this propagated light, light that has entered the light-emitting surface of the light-guide plate (surface on the side facing in the +Z direction) at an angle that is greater than the critical angle undergoes total reflection and remains in the light-guide plate 12. When the critical angle is 41.8 degrees, for example, the light that has entered the light-emitting surface at an incident angle of 42 degrees undergoes total reflection from the light-emitting surface, and the light arrives at the lower surface of the light-guide plate 12. The lower surface is inclined 4 degrees toward the +Z direction with respect to the +X direction. Therefore, the incident angle of the light on the lower surface is 38 degrees. Since the incident angle is less than 41.8 degrees, which is the critical angle, the light incident on the light diffusion surface is oriented in the direction inclined 66 degrees with respect to the normal line to the lower surface, and is emitted from the lower surface of the light-guide plate 12. In other words, light with high directivity is emitted from the lower surface of the light-guide plate 12 in a direction inclined 70 degrees toward the +X direction with respect to the −Z direction.

Light emitted from the lower surface of the light-guide plate 12 in this manner arrives at the reflective sheet 20. Since the slope angles $\theta_{14}$ of the sloped surfaces 20b of the convexities 20a that are the closest to the −X direction in the reflective sheet 20 are equal to 30 degrees, the light that has entered the sloped surfaces 20b of the convexities 20a that are the closest to −X direction is reflected in a direction inclined 10 degrees away from the +Z direction toward the +X direction. Also, light that has entered the sloped surfaces 20b of the convexities 20a in the center area of the X-axis direction is reflected in the +Z direction because the slope angles $\theta_{14}$ of the sloped surfaces 20b are equal to 35 degrees. Light that has entered the sloped surfaces 20b of the convexities 20a that are the closest to the +X direction is reflected in a direction inclined 10 degrees away from the +Z direction toward the −X direction. In this manner, light that has leaked from the light-guide plate can be focused toward the front position by forming a distribution from the slope angles $\theta_{14}$ of the plurality of convexities 20a arrayed in the +X axis direction.

The light reflected and focused by the reflective sheet 20 passes through the light-guide plate 12 and enters the louver 4. In the louver 4, the transmission/absorption boundaries are parallel to the traveling direction of the light. Therefore, only the principal-direction component of the light is allowed to pass through, and the directivity of the light is increased. As described in the fifth embodiment above, the light also contains a high-directivity component that is emitted from the light-guide plate to the louver side in the direction inclined 70 degrees toward the +X direction with respect to the +Z direction. However, this light is blocked by the light-blocking layer of the louver. Therefore, only light reflected by the reflective sheet 20 and focused toward the front position can be emitted, and the brightness of the screen can be made uniform as viewed from the front position.

In the present embodiment, light is focused in the X-axis direction by the reflective sheet 20, so there is no requirement to provide a Fresnel lens sheet or another deflecting element. For this reason, the cost of the light source apparatus can be reduced. The operation and effects other than those described above in connection with the present embodiment are the same as those of the second embodiment described above.

What is claimed is:

1. An optical member comprising:
a planar Fresnel lens for deflecting and emitting incident light consisting of a plurality of luminous fluxes that have a directivity to a direction depending on an incident position of light, and focusing a principal-direction component of each luminous flux in the plurality of luminous fluxes toward a single observation point of an observer; and
an element for restricting a direction of light rays that restricts the luminous fluxes emitted from the planar Fresnel lens to a direction parallel with the focused direction of the principal-direction component of each luminous flux emitted from the planar Fresnel lens, and further increases a directivity of the luminous fluxes,
wherein the element for restricting the direction of light rays is a sheet in which a plurality of light absorptive areas and light transmissive areas are alternately arrayed, a boundary between the absorptive areas and the transmissive areas is sloped with respect to a direction perpendicular to the light-emitting surface so as to be parallel with the principal-direction component of the luminous fluxes emitted from the planar Fresnel lens, a direction of the light is restricted so that the light is emitted from a surface of the sheet along the principal-direction component of the luminous fluxes and that the emitted light is directed toward the single observation point.

2. A light source apparatus, having:
a planar light source for emitting planar light, and
the optical member according to claim 1 for receiving light emitted from the planar light source, wherein the light emitted from the planar light source has a strongest component in a direction perpendicular to the light-emitting surface.

3. The light source apparatus according to claim 2, having a transparent/scattering switching element that can switch between a transparent state in which light emitted from said element for restricting the direction of light rays is allowed to pass, and a scattering state in which the light is scattered.

4. A display apparatus, having:
the light source apparatus according to claim 2, and
a display panel for adding an image to light by transmitting the light emitted from the light source apparatus.

5. A tenninal apparatus, having the display apparatus according to claim 4.

6. The terminal apparatus according to claim 5, being a television receiver, desktop personal computer, notebook computer, ATM, automatic vending machine, onboard television receiver, PDA, game machine, digital video camera, digital camera, video player, or mobile phone.

7. The optical member according to claim 1, wherein a machined surface of the Fresnel lens is made so that depths of grooves are substantially equal, and a lens pitch is modulated to focus light.

8. The optical member according to claim 1, wherein:
the element for restricting the direction of light rays comprises a sheet on which transmissive areas and absorptive areas of light are alternatively arrayed in one direction;
the boundary between the transmissive areas and absorptive areas is inclined to be parallel with an imaginary line connecting centers of mass of the absorptive areas on the sheet; and
positions of the centers of mass are at equal distances in the one direction in which the transmissive areas and the absorptive areas are alternatively arrayed.

9. The optical member according to claim 8, wherein a non-machined surface of the Fresnel lens is in close contact with a flat surface of the element for restricting the direction of light rays.

10. A light source apparatus, having:
a planar light source for emitting planar light, and
the optical member according to claim 8 for receiving light emitted from the planar light source,
wherein the light emitted from the planar light source has a strongest component in a direction perpendicular to the light-emitting surface.

11. The light source apparatus according to claim 10, further having:
a light source; and
a light guide plate in which light emitted from the light source is incident on a side surface thereof, and the incident light is planarly emitted from a principal surface thereof.

12. A display apparatus at least having:
the light source apparatus according to claim 10;
a display device that displays a video image by adjusting light incident from a rear side; and
a transparent/scattering switching element that can switch between a transparent state in which light incident from the rear side is allowed to pass and a scattering state in which the light is scattered,
wherein an order of placement from an observer side is the display device, the transparent/scattering switching element, the optical member, and the planar light source.

* * * * *